US009380602B2

United States Patent
Park et al.

(10) Patent No.: US 9,380,602 B2
(45) Date of Patent: Jun. 28, 2016

(54) METHOD AND STATION FOR ACCESSING CHANNEL IN WIRELESS LAN

(71) Applicant: LG ELECTRONICS INC., Seoul (KR)

(72) Inventors: Giwon Park, Seoul (KR); Kiseon Ryu, Seoul (KR); Jinsoo Choi, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/431,690

(22) PCT Filed: Oct. 16, 2013

(86) PCT No.: PCT/KR2013/009248
§ 371 (c)(1),
(2) Date: Mar. 26, 2015

(87) PCT Pub. No.: WO2014/061992
PCT Pub. Date: Apr. 24, 2014

(65) Prior Publication Data
US 2015/0245382 A1    Aug. 27, 2015

Related U.S. Application Data

(60) Provisional application No. 61/714,231, filed on Oct. 16, 2012.

(51) Int. Cl.
*H04M 3/42*    (2006.01)
*H04W 72/00*    (2009.01)
(Continued)

(52) U.S. Cl.
CPC ........ *H04W 74/008* (2013.01); *H04W 72/0406* (2013.01); *H04W 74/0808* (2013.01); *H04W 48/14* (2013.01); *H04W 84/12* (2013.01)

(58) Field of Classification Search
CPC . H04W 74/00; H04W 74/0808; H04W 36/14; H04W 36/22; H04W 48/16; H04W 52/0215; H04W 48/14; H04W 74/066
USPC .................................................. 455/434, 450
See application file for complete search history.

(56) References Cited

U.S. PATENT DOCUMENTS 9,210,726 B2 *  12/2015  Bai ...................... H04W 74/008
9,264,981 B2 *   2/2016  Seok ...................... H04W 48/16
(Continued)

FOREIGN PATENT DOCUMENTS

JP    2005-012275    1/2005
JP    2008-079141    4/2008
(Continued)

OTHER PUBLICATIONS

PCT International Application No. PCT/KR2013/009248, Written Opinion of the International Searching Authority dated Jan. 15, 2014, 1 page.

*Primary Examiner* — William D Cumming
(74) *Attorney, Agent, or Firm* — Lee, Hong, Degerman, Kang & Waimey; Jonathan Kang; Harry Lee

(57) ABSTRACT

A method and an apparatus for accessing a channel in a wireless LAN. A method for a station (STA) accessing a channel may comprise: a step of the STA receiving an access distribution element through a passive scanning frame; the STA selecting an access random variable based on the access distribution element; a step of the STA determining a minimum value of a passive scanning-specific competition window based on the access random variable; and the STA accessing the channel based on a back off time that is determined based on the passive scanning-specific competition window.

16 Claims, 19 Drawing Sheets

(51) Int. Cl.
  *H04W 74/00* (2009.01)
  *H04W 74/08* (2009.01)
  *H04W 72/04* (2009.01)
  *H04W 84/12* (2009.01)
  *H04W 48/14* (2009.01)

(56) References Cited

U.S. PATENT DOCUMENTS

| | | | | |
|---|---|---|---|---|
| 2014/0328325 A1* | 11/2014 | Bai | ............... | H04W 74/008 370/331 |
| 2015/0178277 A1* | 6/2015 | Singhal | ............... | G06F 17/3048 706/20 |
| 2015/0245382 A1* | 8/2015 | Park | ............... | H04W 74/0808 455/450 |
| 2015/0365888 A1* | 12/2015 | Koskinen | ............... | H04W 36/22 370/338 |
| 2015/0382224 A1* | 12/2015 | Himayat | ............... | H04W 36/14 370/332 |
| 2015/0382333 A1* | 12/2015 | Seok | ............... | H04W 74/0808 370/338 |
| 2016/0007274 A1* | 1/2016 | Park | ............... | H04W 48/16 455/434 |
| 2016/0007275 A1* | 1/2016 | Park | ............... | H04W 48/14 455/434 |
| 2016/0007379 A1* | 1/2016 | Seok | ............... | H04W 74/085 370/338 |
| 2016/0007386 A1* | 1/2016 | Park | ............... | H04W 48/14 370/329 |
| 2016/0014773 A1* | 1/2016 | Seok | ............... | H04W 52/0216 370/338 |
| 2016/0021609 A1* | 1/2016 | Park | ............... | H04W 48/20 370/338 |
| 2016/0044662 A1* | 2/2016 | Kim | ............... | H04W 74/006 370/338 |

FOREIGN PATENT DOCUMENTS

| | | |
|---|---|---|
| KR | 10-2004-0024784 | 3/2004 |
| KR | 10-0948380 | 3/2010 |
| KR | 10-2012-0071837 | 7/2012 |

* cited by examiner

FIG. 1
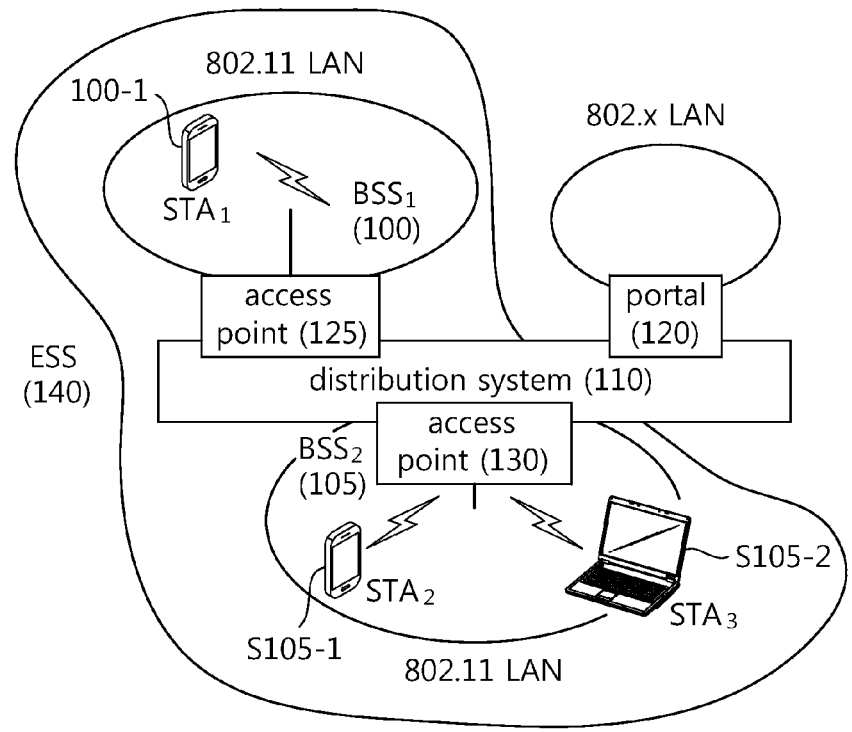
(A)
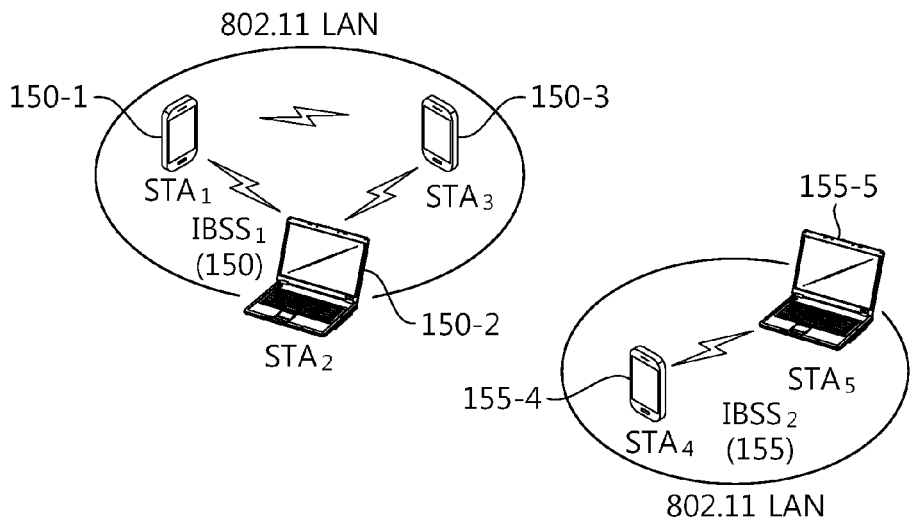
(B)

FIG. 6
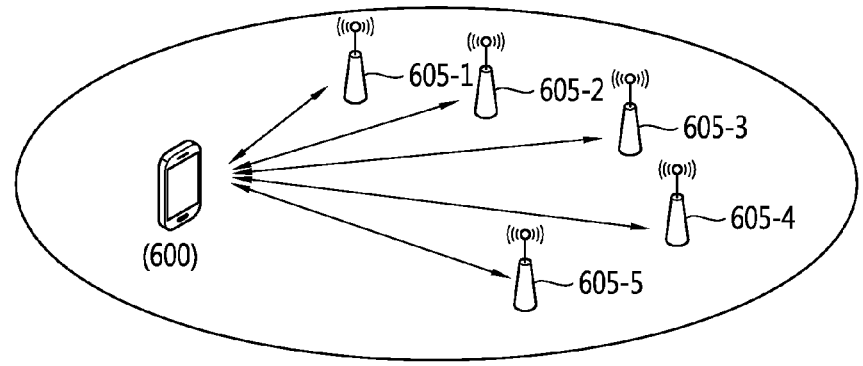
probe request frame (610)
(wildcard, SSID, wildcard BSSID)   (A)
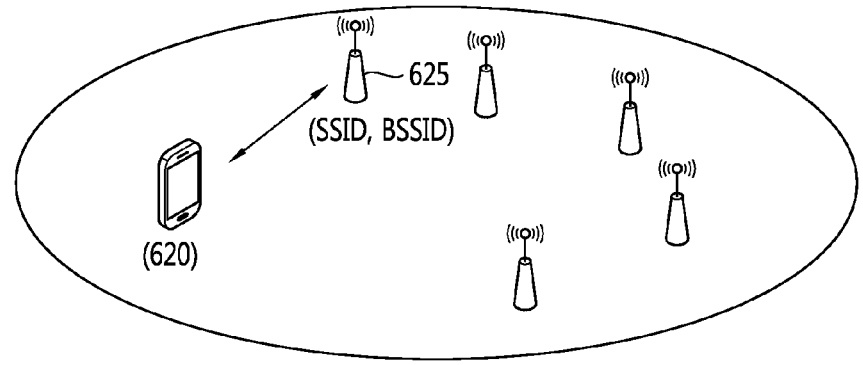
probe request frame(630)
(SSID, BSSID)   (B)
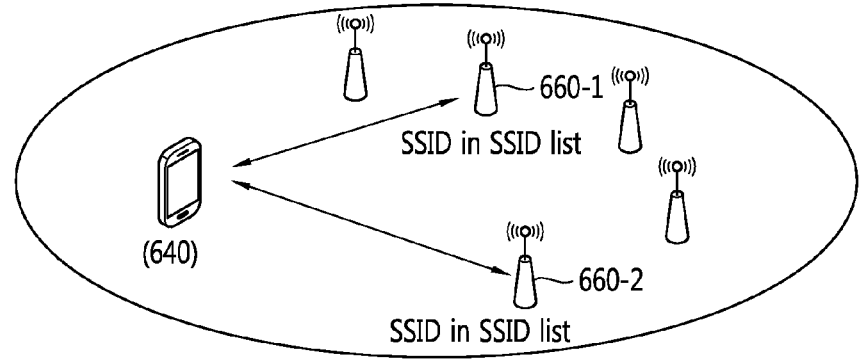
probe request frame (660)
(SSID, wildcard BSSID)   (C)

METHOD AND STATION FOR ACCESSING CHANNEL IN WIRELESS LAN

CROSS-REFERENCE TO RELATED APPLICATIONS

This application is the National Stage filing under 35 U.S.C. 371 of International Application No. PCT/KR2013/009248, filed on Oct. 16, 2013, which claims the benefit of U.S. Provisional Application Ser. No. 61/714,231, filed on Oct. 16, 2012, the contents of which are all hereby incorporated by reference herein in their entirety.

BACKGROUND OF THE INVENTION

1. Field of the Invention

The present invention relates to wireless LANs, and more specifically, to a method and apparatus for accessing a medium in a wireless LAN.

2. Related Art

Recent wireless LAN techniques are evolving typically in three ways. Efforts to achieve accelerated transmission in consistence with those phases have spawned IEEE (Institute of Electrical and Electronic Engineers) 802.11ac and IEEE 802.11ad. IEEE 802.11ad is a wireless LAN technique adopting a 60 GHz band. As a technique for providing wider coverage than that of existing wireless LAN, wideband wireless LAN employing a frequency band less than 1 GHz are recently gaining popularity. Wideband wireless LAN comes in two standards: IEEE 802.11af adopting a TVWS (TV white space) band and IEEE 802.11lh adopting a 900 MHz band. These wireless LAN techniques primarily target smart grids, wider-area sensors, and extended range Wi-Fi services. Existing wireless LAN MAC (Medium Access Control) techniques are sometimes challenged by a significantly increased initial link setup time. Vigorous efforts for IEEE 802.11ai standardization are recently ongoing to address this issue and resultantly enable quick access of an STA to an AP.

IEEE 802.11ai is the MAC technology dealing with rapid authentication procedures in order to substantially save initial setup and association times, and a regular task group for standardization was launched in January 2011. In order to enable quick access, IEEE 802.11ai deals with simplifying processes in light of AP discovery, network discovery, TSF (Time Synchronization Function) synchronization, authentication & association, procedure merging with higher layers, and so on. Among others, ideas such as procedure merging utilizing piggyback of DHCP (Dynamic Host Configuration Protocol), optimization of full EAP (Extensible Authentication Protocol) using concurrent IP, and efficient selective AP (Access Point) scanning, are under intense discussion.

SUMMARY OF THE INVENTION

An object of the present invention is to provide an initial access method.

Another object of the present invention is to provide an apparatus for performing an initial access method.

To achieve the above objects of the present invention, according to an aspect of the present invention, a channel access method by a station (STA) may comprise receiving an access distribution factor through a passive scanning frame by the STA; selecting an access random variable based on the access distribution factor by the STA; determining a passive scanning specific minimum contention window value based on the access random variable by the STA; and performing channel access based on a backoff time determined based on the passive scanning specific minimum contention window value by the STA.

To achieve the above objects of the present invention, according to another aspect of the present invention, a station (STA) operating in a wireless LAN may comprise an RF (radio frequency) unit communicating a radio signal; and a processor selectively connected with the RF unit, wherein the processor is implemented to receive an access distribution factor through a passive scanning frame; select an access random variable based on the access distribution factor; determine a passive scanning specific minimum contention window value based on the access random variable; and perform channel access based on a backoff time determined based on the passive scanning specific minimum contention window value.

A plurality of STAs are enabled to access a channel based on different parameters from each other. Accordingly, when the plurality of STAs perform initial access on the same channel, the initial accesses activities of the STAs may be distributed.

BRIEF DESCRIPTION OF THE DRAWINGS

FIG. 1 is a concept view illustrating the structure of a wireless LAN (Local Area Network);

FIG. 6 is a concept view illustrating a method of transmitting a probe request frame;

DESCRIPTION OF EXEMPLARY EMBODIMENTS

An upper part of FIG. 1(A) shows the structure of the IEEE (institute of electrical and electronic engineers) 802.11 infrastructure network.

Referring to the upper part of FIG. 1(A), the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
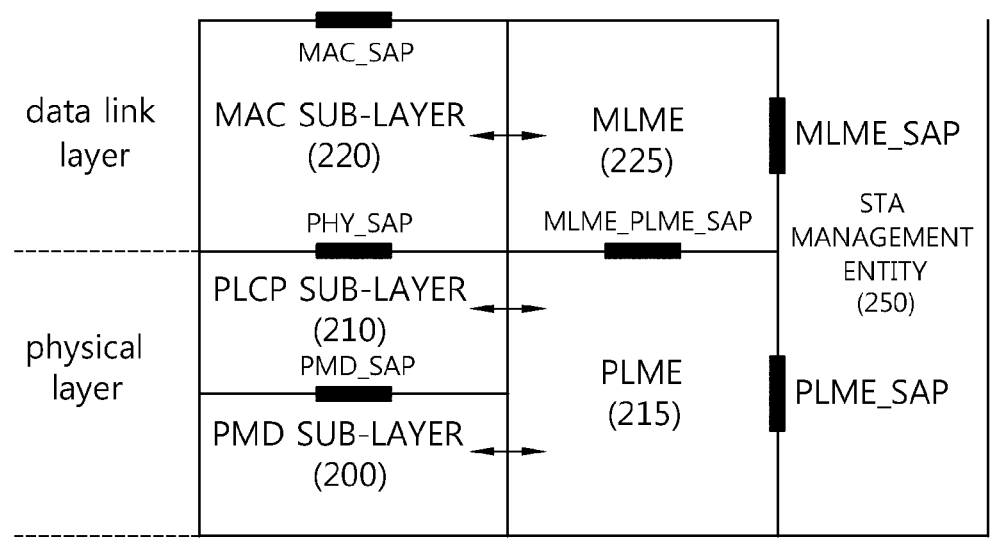
FIG. 2 is a view illustrating the layer architecture of a wireless LAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 210 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Figure 3:
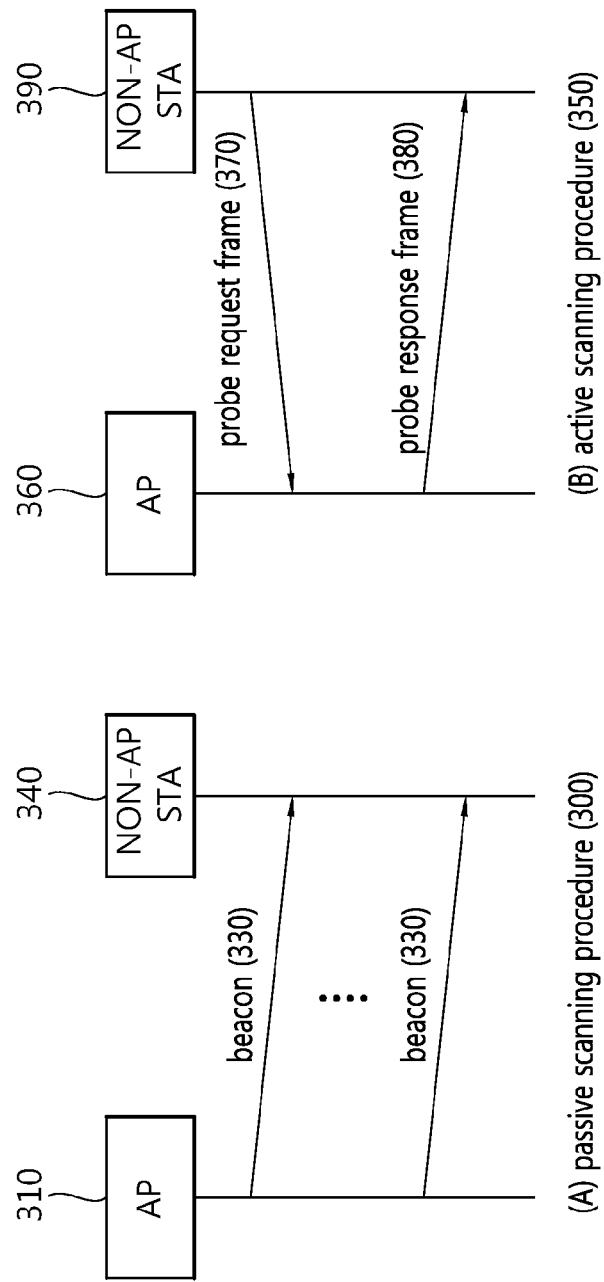
FIG. 3 is a concept view illustrating a scanning method by WLAN.

FIG. 3 is a concept view illustrating a scanning method in a WLAN.

Referring to FIG. 3, the scanning method may be divided into passive scanning 300 and active scanning 350.

Referring to a left part of FIG. 3, the passive scanning 300 may be performed by a beacon frame 330 that is periodically broadcast from the AP 310. The AP 310 in the WLAN broadcasts the beacon frame 330 to the non-AP STA 340 at a particular period (e.g., per 100 msec). The beacon frame 330 may contain information on the current network. The non-AP STA 340 may perform scanning on the channel with the AP 310 to perform the authentication/association process by obtaining the network information from the beacon frame 330 periodically broadcast.

The passive scanning method 300 only receives the beacon frame 330 transmitted from the AP 310 without the need for the non-AP STA 340 to transmit a frame. Accordingly, the passive scanning 300 is advantageous of a reduction in the overall overhead that is created upon data transmission/reception over the network. However, since the scanning is obliged to be passively performed in proportion to the period of the beacon frame 330, the time taken to perform scanning may be increased. The details of the beacon frame are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter, IEEE 802.11)' 8.3.3.2 beacon frame disclosed on November 2011. IEEE 802.11ai may additionally use other format of a beacon frame, and such beacon frame may be referred to as a FILS (fast initial link setup) beacon frame. Further, the measurement pilot frame is a frame containing only some information of the beacon frame, and the measurement pilot frame may be used in the scanning procedure. The measurement pilot frame is set forth in IEEE 802.11 8.5.8.3 measurement pilot format.

Also, a fast initial link setup (FILS) discovery frame may be defined. The FILS discovery frame is a frame transmitted between each of the transmission periods in each AP, may be a frame transmitted with a shorter period than the beacon frame. That is, the FILS discovery frame is a frame transmitted with a shorter period than a transmission period of the beacon frame. The FILS discovery frame may include identification information (SSID, BSSID) of an AP that transmits the FILS discovery frame. It may be implemented that the FILS discovery frame is transmitted to an STA before the beacon frame is transmitted, and thus, the STA may search that an AP is existed in the corresponding channel beforehand. An interval of which the FILS discovery frame is transmitted in one AP is referred to as an FILS discovery frame transmission interval. The FILS discovery frame may be transmitted with a part of information included in the beacon frame being included. The FILS discovery frame may also include information for a transmission time of the beacon frame of neighbor AP.

Referring to a right part of FIG. 3, the active scanning 350 refers to a method in which the non-AP STA 390 leads scanning by transmitting a probe request frame 370 to the AP 360.

After receiving the probe request frame 370 from the non-AP STA 390, the AP 360 may wait a random time to prevent frame collision, and the AP 360 then includes network information in a frame response frame 380, then sending the same to the non-AP STA 390. The non-AP STA 390 may obtain the network information based on the received probe response frame 380 to stop the scanning process.

The active scanning 350 allows the non-AP STA 390 to lead the scanning process, and the active scanning 350 has the advantage of a short scanning time. However, the non-AP STA 390 should transmit the probe request frame 37, resulting in an increase in the network overhead for frame transmission and reception. The probe request frame 370 is set forth in IEEE 802.11 Ch. 8.3.3.9, and the probe response frame 380 is set forth in IEEE 802.11 Ch. 8.3.3.10.

After the scanning is done, the AP and the STA may conduct an authentication and association procedure.

Figure 4:
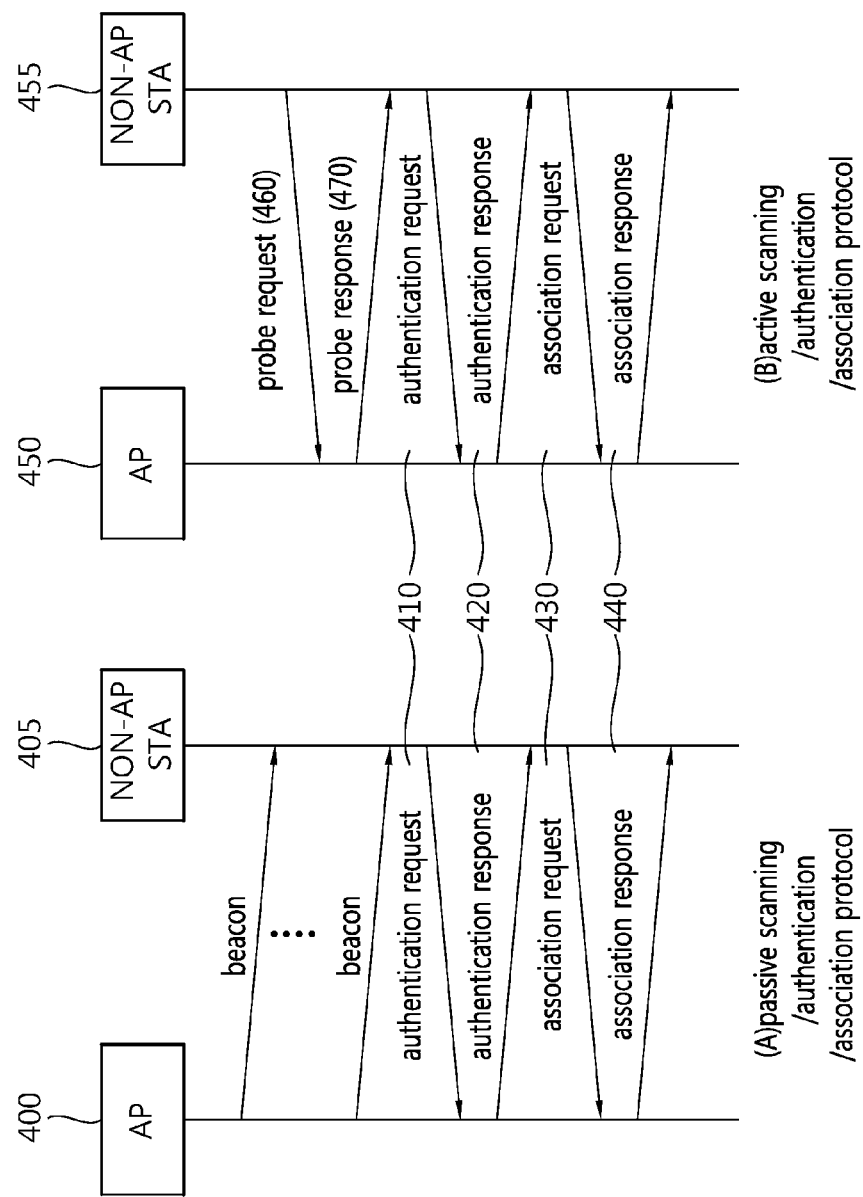
FIG. 4 is a concept view illustrating an authentication and association process after scanning an AP and an STA.

FIG. 4 is a concept view illustrating an authentication and association process after scanning between an AP and an STA.

Referring to FIG. 4, after passive/active scanning, the authentication and association may be conducted with one of the scanned APs.

The authentication and association process may be carried out by way of, e.g., 2-way handshaking. A left part of FIG. 4 is a concept view illustrating an authentication and association process after passive scanning, and a right part of FIG. 4 is a concept view illustrating an authentication and association process after active scanning.

The authentication and association process may be equally performed by exchanging an authentication request frame 410/authentication response frame 420 and an association request frame 430/association response frame 440 between the AP 400 or 450 and the non-AP STA 405 or 455 regardless of which one of the active scanning method and the passive scanning method has been used.

The authentication process may be conducted by transmitting the authentication request frame 410 from the non-AP STA 405 or 455 to the AP 400 or 450. In response to the authentication request frame 410, the authentication response frame 420 may be transmitted from the AP 400 or 450 to the non-AP STA 405 or 455. The authentication frame format is set forth in IEEE 802.11 Ch. 8.3.3.11.

The association process may be conducted by transmitting the association request frame 430 from the non-AP STA 405 or 455 to the AP 400 or 405. In response to the association request frame 430, the association response frame 440 may be transmitted from the AP 400 or 450 to the non-AP STA 405 or 455. The transmitted association request frame 430 contains information on the capability of the non-AP STA 405 or 455. Based on the information on the capability of the non-AP STA 405 or 455, the AP 400 or 450 may determine whether the non-AP STA 405 or 455 may be supported. In case such support is possible, the AP 400 or 450 may include in the association response frame 440 whether to accept the association request frame 440 and a reason therefore, and its supportable capability information, and the AP 300 or 450 may send the same to the non-AP STA 405 or 455. The association frame format is set forth in IEEE 802.11 Chs. 8.3.3.5/8.3.3.6.

After the association step is done, normal data transmission and reception is carried out. The association, unless done, is re-conducted based on the reason for which the association is not performed, or association with other AP may be performed.

Figure 5:
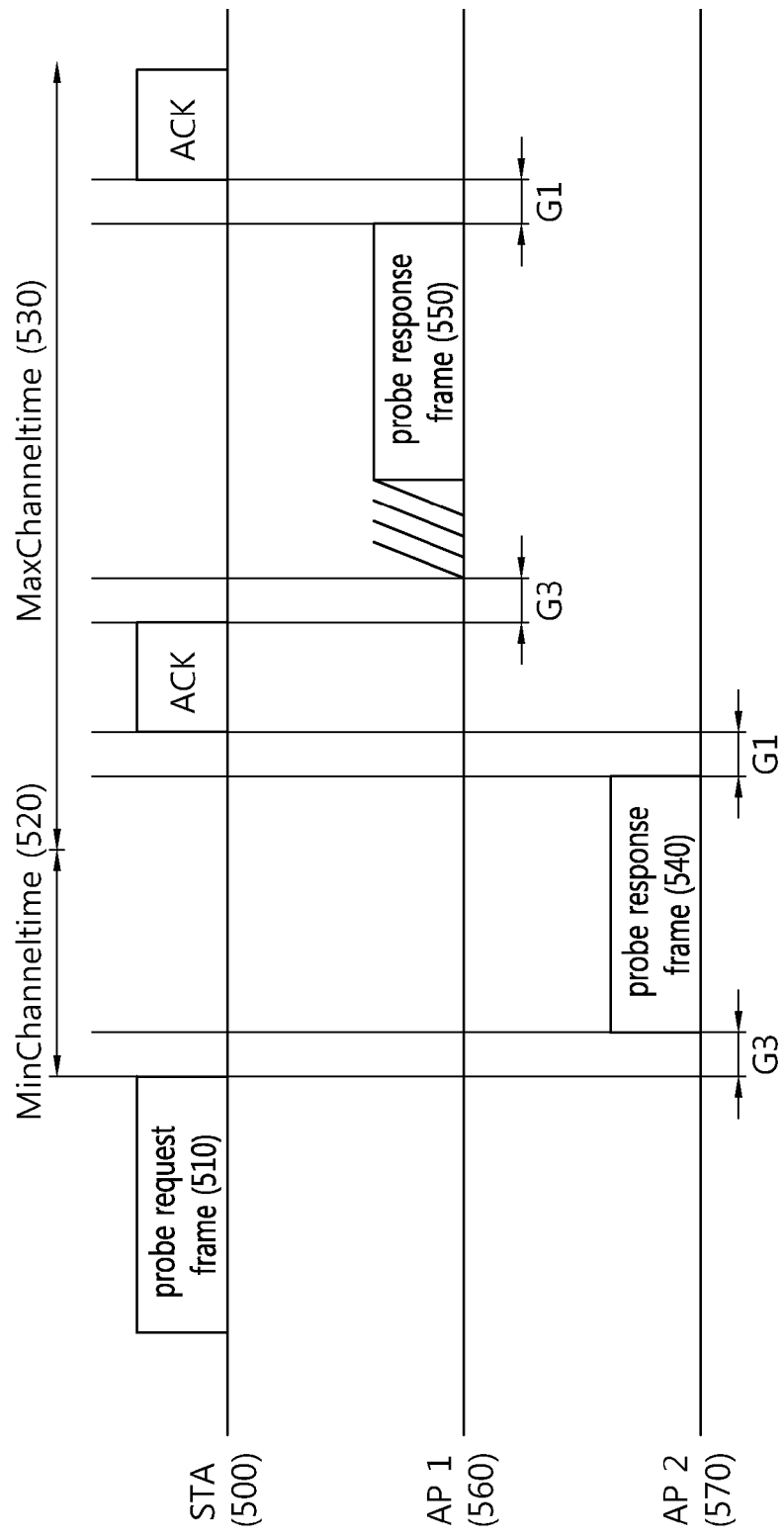
FIG. 5 is a concept view illustrating an active scanning procedure.

FIG. 5 is a concept view illustrating an active scanning procedure.

Referring to FIG. 5, the active scanning procedure may be performed in the following steps.

(1) It is determined whether the STA 500 is ready to perform the scanning procedure.

The STA 500 may wait, e.g., until the probe delay time expires or particular signaling information (for example, PHY-RXSTART.indication primitive) is received to perform active scanning.

The probe delay time is a delay that occurs before the STA 500 sends a probe request frame 510 when performing active scanning. PHY-RXSTART.indication primitive is a signal that is transmitted from the physical (PHY) layer to the local MAC (medium access control) layer. PHY-RXSTART.indication primitive may signal information indicating that the PLCP (physical layer convergence protocol) has received a PPDU (PLCP protocol data unit) including a valid PLCP header to the MAC layer.

(2) Basic access is performed.

In the 802.11 MAC layer, a number of STAs may share a radio medium using a distributed coordination function (DCF) that is a contention-based function. The DCF may prevent collision between STAs through a back-off scheme using the carrier sense multiple access/collision avoidance (CSMA/CA) as its access protocol. The STA 500 may transmit the probe request frame 510 to the APs 560 and 570 using a basic access method.

(3) Information for specifying the APs 560 and 570 included in MLME-SCAN.request primitive (for example, SSID (service set identification) and BSSID (basic service set identification) information) may be included in the probe request frame 510 and may be transmitted.

The BSSID may have a value corresponding to the MAC address of the AP as an indicator to specify the AP. The SSID (service set identification) is a network term for specifying an AP, which may be read by a person who operates the STA. The BSSID and/or SSID may be used to specify an AP.

The STA 500 may specify an AP based on the information to specify the APs 560 and 570 included by MLME-SCAN-.request primitive. The specified APs 560 and 570 may send the probe response frames 550 and 550 to the STA 500. The STA 500 may include the SSID and BSSID information in the probe request frame 510 and send the same, thereby unicasting, multicasting, or broadcasting the probe request frame 510. A method of unicasting, multicasting, or broadcasting the probe request frame 510 using the SSID and BSSID information is further described with reference to FIG. 5.

For example, in case an SSID list is included in MLME-SCAN.request primitive, the STA 500 may include the SSID list in the probe request frame 510 and transmit the same. The APs 560 and 570 may receive the probe request frame 510, determine the SSIDs included in the SSID list contained in the received probe request frame 510, and determine whether to send the probe response frames 550 and 550 to the STA 200.

(4) A probe timer is initialized as 0 and is then operated.

The probe timer may be used to check a minimum channel time (MinChanneltime, 520) and a maximum channel time (MaxChanneltime, 530). The minimum channel time 520 and the maximum channel time 530 may be used to control the active scanning operation of the STA 500.

The minimum channel time 520 may be used to perform the operation for varying the channel for conducting active scanning. For example, in case the STA 500 fails to receive the probe response frames 540 and 550 until the minimum channel time 520, the STA 500 shifts scanning channels to perform scanning on other channel. In case the STA 500 receives the probe response frame 550 until the minimum channel time 520, it may process the received probe response frames 540 and 550 after waiting until the maximum channel time 530.

The STA 500 may detect PHY-CCA.indication primitive until the probe timer reaches the minimum channel time 520 and may determine whether other frame (for example, probe response frames 540 and 550) has been received by the STA 500 until before the minimum channel time 520.

PHY-CCA.indication primitive may transmit information on the state of the medium from the physical layer to the MAC layer. PHY-CCA.indication primitive may indicate the current state of the channel using channel state parameters such as "busy" when the channel is unavailable and "idle" when the channel is available. The STA 500 may determine that there are probe response frames 540 and 550 received by the STA 500 when PHY-CCA.indication is detected to be busy and may determine that there are no probe response frames 540 and 550 received by the STA 500 when PHY-CCA.indication is detected to be idle.

In case PHY-CCA.indication is detected to be idle, the STA 500 may set an NAV (net allocation vector) to 0, and the STA 500 may scan a next channel. In case PHY-CCA.indication is detected to be busy, the STA 500 may perform a process on the received probe response frames 540 and 550 after the probe timer reaches the maximum channel time 530. After the process on the received probe response frames 540 and 550 is done, the STA 500 may set the NAV (net allocation vector) to 0 and may then scan a next channel.

Hereinafter, in embodiments of the present invention, determining whether there are probe response frames 540 and 550 received by the STA 500 may also mean that the channel state is determined using PHY-CCA.indication primitive.

(5) In case all the channels included in the channel list (ChannelList) are scanned, the MLME may signal MLME-SCAN.confirm primitive. MLME-SCAN.confirm primitive may contain BSSDescriptionSet including all the information obtained in the scanning process.

In case the STA 500 uses the active scanning method, the STA 500 should perform monitoring to determine whether the parameter of PHY-CCA.indication is busy until the probe timer reaches the minimum channel time.

The specific information included in the above-described MLME-SCAN is as follows. In order for the STA to perform scanning, the MLME may receive MLME-SCAN.request primitive. MLME-SCAN.request primitive is a primitive created by the SME. MLME-SCAN.request primitive may be used to determine whether there is other BSS to which the STA is to be connected.

MLME-SCAN.request primitive may contain information specifically such as BSSType, BSSID, SSID, ScanType, ProbeDelay, ChannelList, MinChannelTime, MaxChannelTime, RequestInformation, SSID List, ChannelUsage, AccessNetworkType, HESSID, MeshID, VendorSpecificInfo. The details of MLME-SCAN.request primitive are set forth in IEEE Draft P802.11-REVmb™/D12, November 2011 'IEEE Standard for Information Technology Telecommunications and information exchange between systems— Local and metropolitan area networks—Specific requirements Part 11: Wireless LAN Medium Access Control (MAC) and Physical Layer (PHY) Specifications' 6.3.3.2 MLME-SCAN.request disclosed on November 2011.

The following Table 1 briefly represents example information included in MLME-SCAN.request primitive.

TABLE 1

| name | description |
|---|---|
| BSSType | Determines whether infrastructure BSS, IBSS, MBSS (Mesh basic service set), or all, are included in the scan |
| BSSID | Identifies a specific or wildcard BSSID |
| SSID | Specifies the desired SSID or the wildcard SSID |
| ScanType | Indicates either active or passive scanning |
| ProbeDelay | Delay(in microseconds) to be used prior to transmitting a probe frame during active scanning |
| ChannelList | Specifies a list of channels that are examined when scanning for a BSS |

TABLE 1-continued

| name | description |
| --- | --- |
| MinChannelTime | The minimum time(in TU) to spend on each channel when scanning |
| MaxChannelTime | The maximum tine(in TU) to spend on each channel when scanning |
| RequirementInforamtion | This element is optionally present if dot11RadioMeasurementActivated is true and is placed in a Probe Request frame to request that the responding STA include the requested information in the Probe Response frame |
| SSID List | One or more SSID elements that are optionally present when dot11MgmtOptionSSIDListActivated is true |
| ChannelUsage | Specific request types for the ChannelUsage request |
| AccessNetworkType | Specifies a desired specific access network type or the wildcard access network type. |
| HESSID | Specifies the desired specific HESSID network identifier or the wildcard network identifier. This field is present when dot11InterworkingServiceActivated is true |
| Mesh ID | Only present if BSSType = MESH or BSSType = ANY_BSS. Specifies the desired Mesh ID or wildcard Mesh ID. |
| RequestParameters | The parameters define the responding STAs |
| ReportingOption | Indicates the result reporting mode |
| APConfigurationChangeCount | When a specific BSSID is indicated in the MLME-SCAN.request, the APConfigurationChangeCount associated with the stored configuration of the AP is optionally provided |
| VendorSpecificInfo | Information added according to each of vendors |

The request parameter included in MLME-SCAN.request primitive may be used to determine whether the responding STA is to transmit a probe response frame. The request parameter may contain information for requesting that other BSS's information be included in the probe response frame. Also, the request parameter may include a report request field, a delay reference field, and a maximum delay limit field.

The report request field contains information to request that other BSS's information be included in the probe response frame, the delay reference field contains information on the delay type applied as a response to the probe request frame, and the maximum delay limit field may contain the maximum access delay information on the delay type indicated by the delay reference field.

Besides, the request parameter may include a minimum data rate field and/or a received signal strength limit field. The minimum data rate field contains information on the lowest overall data rate in transmitting an MSDU or A-MSDU. The received signal strength limit field may further contain information on the limit value of the signal necessary for a recipient of the probe request frame to respond.

FIG. 6 is a concept view illustrating a probe request frame transmission method.

FIG. 6 discloses methods of broadcasting, multicasting, and unicasting probe request frames from an STA.

An upper part of FIG. 6 shows a method in which the STA 600 broadcasts the probe request frame 610.

The STA 600 may include a wildcard SSID and a wildcard BSSID in the probe request frame 610 and broadcast the probe request frame 610.

The wildcard SSID and the wildcard BSSID may be used as identifiers to indicate all of the APs 605-1, 605-2, 605-3, 605-4, and 605-5 included in the transmission range of the STA 600.

In case the STA 600 transmits the probe request frame 610 with the wildcard SSID and the wildcard BSSID included in the probe request frame 610, the APs 605-1, 605-2, 605-3, 605-4, and 605-5 that have received the probe request frame 610 from the STA 600 may send probe response frames to the STA 600 in response to the received probe request frame.

In case the APs 605-1, 605-2, 605-3, 605-4, and 605-5 that have received the broadcast probe request frame 610 send the probe response frames to the STA 600 in response to the received probe request frame 610 within a predetermined time, the problem may occur that the STA 600 should simultaneously receive and process too many probe response frames.

An middle part of FIG. 6 shows a method in which the STA 620 unicasts the probe request frame 630.

Referring to the middle part of FIG. 6, in case the STA 620 unicasts the probe request frame 630, the STA 620 may transmit the probe request frame 630 containing particular SSID/BSSID information of the AP. Among the APs that receive the probe request frame 630, only the AP 625 corresponding to the SSID/BSSID specified by the STA 620 may transmit a probe response frame to the STA 620.

An lower part of FIG. 6 shows a method in which the STA 640 multicasts the probe request frame 660.

Referring to the lower part of FIG. 6, the STA 640 may include an SSID list and a wildcard BSSID in the probe request frame 660 and transmit the same. Among the APs receiving the probe request frame 660, the APs 660-1 and 660-2 corresponding to the SSIDs included in the SSID list contained in the probe request frame may transmit a probe response frame to the STA 640.

As described above, existing STAs may determine, based on the SSID and BSSID included in the MLME.SCAN-request primitive, whether they unicast, multicast, or broadcast a probe request frame. The probe request frame may be unicast, multicast, or broadcast based on the following settings of the MLME.SCAN-request primitive.

In case the MLME.SCAN request primitive includes a particular BSSID, the STA unicasts a probe request frame to an AP with the particular BSSID. The particular BSSID of the AP may be included in the address field of the MAC header in the unicast probe request frame.

In case the MLME.SCAN request primitive includes an SSID or an SSID list along with a wild card BSSID, the STA may multicast a probe request frame to the AP corresponding to the SSID or SSID list. The SSID or SSID list may be included in the probe request frame, and the BSSID may be included in the address field of the MAC header in the probe request frame.

In case the MLME.SCAN request primitive includes a wild card SSID, the STA may broadcast a probe request frame. The wild card SSID may be included in the probe request frame, and a wild card BSSID may be included in the address field of the MAC header.

Hereinafter, the radio access scheme used in 802.11 is disclosed.

Basically, the MAC layer may utilize a DCF (Distributed Coordination Function) as a method for sharing a radio medium by a plurality of STAs. The DCF is based on CSMA/CA (Carrier Sensing Multiple Access with Collision Avoidance). Optionally, the MAC layer defines a method for sharing a medium between STAs based on RTS (Request To Send)/CTS (Clear To Send). The details of the DCF are described below.

Figure 7:
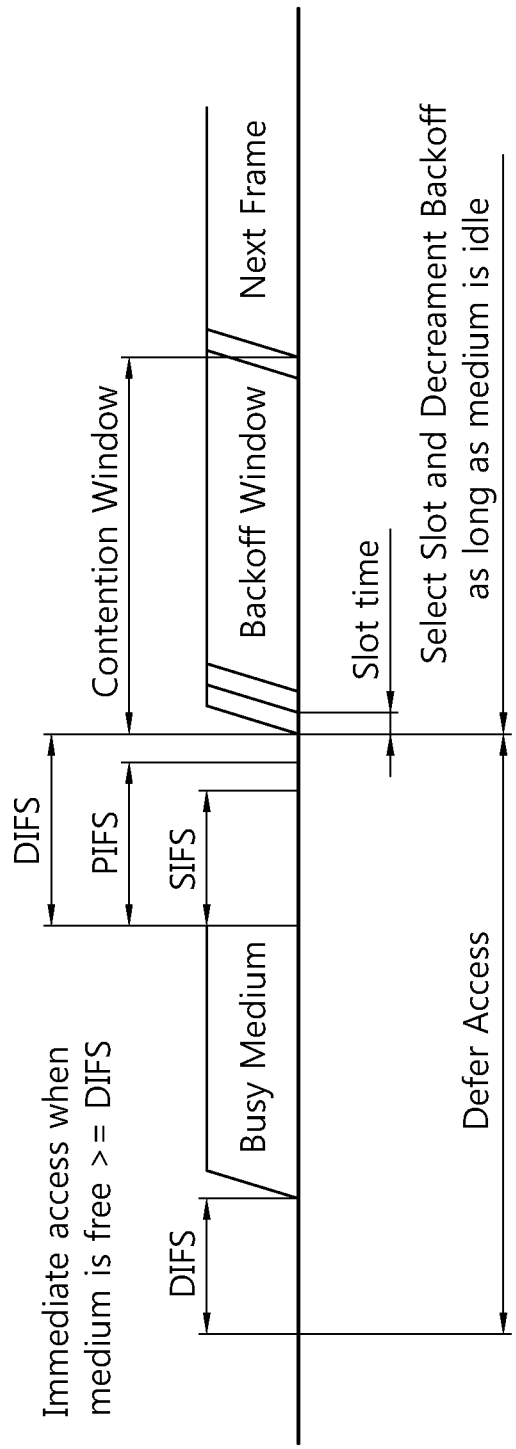
FIG. 7 is a concept view illustrating a DCF access process.

FIG. 7 is a concept view illustrating a DCF access process.

Generally, when an operation is conducted under the DCF access environment, if a medium is not used for a DIFS period or more (i.e., if idle), an STA may transmit an immediate MPDU (MAC Protocol Data Unit). In case the medium is determined to be in use by a carrier sensing mechanism, the STA may determine the size of a CW (Contention Window) by a random backoff algorithm and may perform a backoff procedure. In order to perform the backoff procedure, the STA sets up the CW and selects some time slot. This is called a backoff time. Among others, an STA having the shortest backoff time may access the medium, and the other STAs may stop the remaining backoff time and wait until the transmitting terminal completes the transmission. After the frame transmission of the STA is complete, the other STAs conduct contention over the remaining backoff time to obtain the medium.

In other words, in case the STA gains access to a channel using the DCF, the STA may detect the channel state for a predetermined time. Specifically, the STA, in case the channel remains idle during DIFS( ) attempts transmission after a random backoff time. Such DCF-based transmission scheme plays a role to avoid a plurality of STAs from simultaneously performing transmission, thus preventing collision.

The random backoff time is a time period during which the channel waits before a frame is transmitted after waiting a predetermined time (for example, DIFS), and the random backoff time may be defined as in the following equation:

<Equation 1>

$$\text{Backoff time} = \text{Random}(\ ) \times \text{SlotTime} \quad (1)$$

Random( )=an integer between 0 and CW
CW is an integer between CWmin and CWmax

Figure 8:
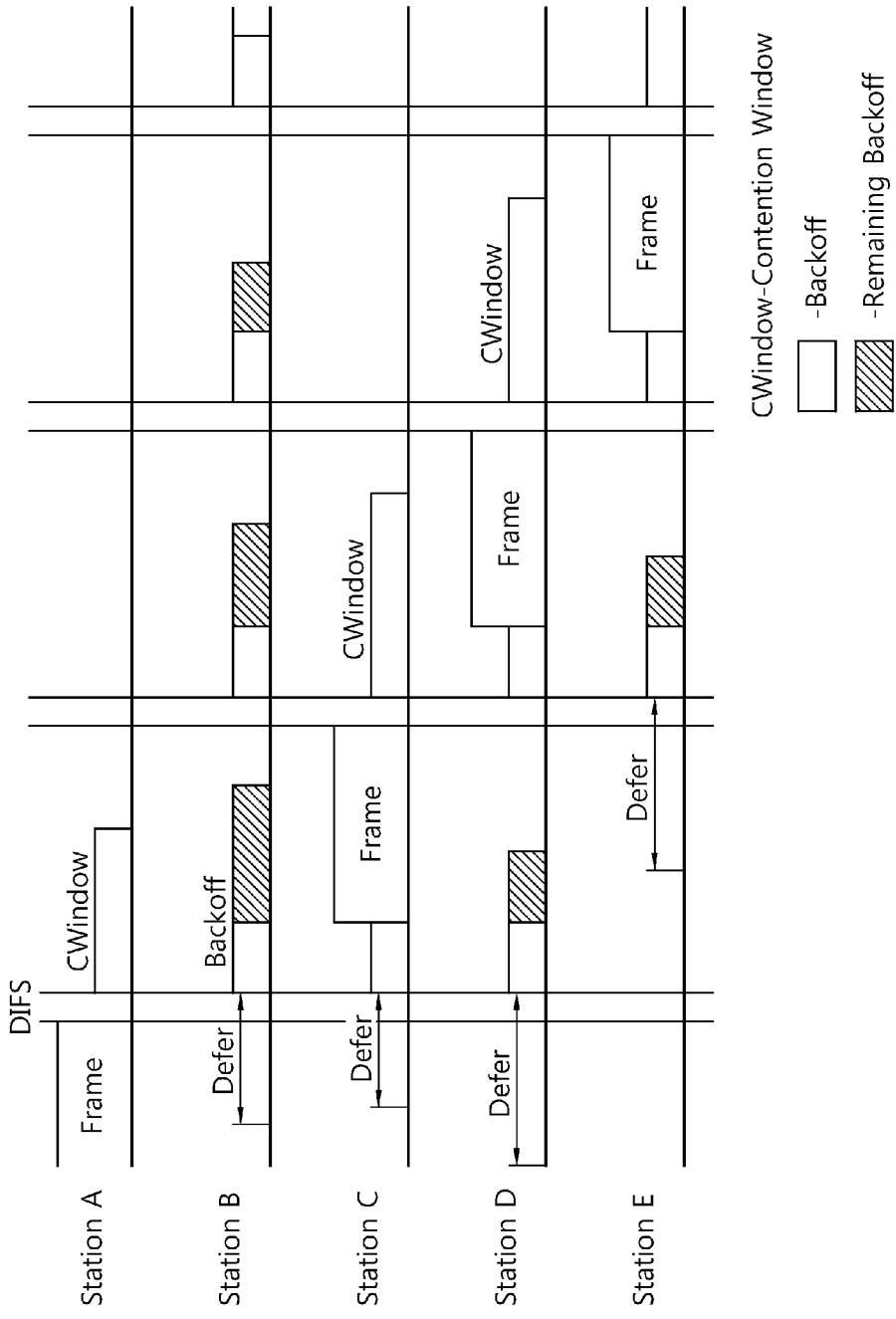
FIG. 8 is a concept view illustrating a backoff procedure by a plurality of STAs.

FIG. 8 is a concept view illustrating a backoff procedure of a plurality of STAs.

Referring to FIG. 8, a backoff slot may occur after a medium is determined to be idle for a DIFS period. If no activity of the medium is detected, the STA may reduce the backoff time based on aSlotTime. In case the medium is determined to be in use for the backoff slot, the STA might not reduce the backoff time. The frame transmission of the STA may be initiated whenever a set backoff timer is 0.

Further, the DCF transmission scheme includes an RTS/CTS access mode in which control frames (RTS, CTS) are exchanged before a data frame is transmitted to pre-occupy a channel. Such scheme may reduce channel waste by replacing a collision that may occur upon transmission of a data frame with a collision by a relatively short control frame.

As another method for sharing a radio medium by a plurality of STAs at the MAC layer, a PCF (Point Coordination Function) may be defined. The above-described DCF is based on the CSMA/CA scheme and is thus not able to guarantee real-time transmission of data transmitted between an STA and an AP. In contrast, the PCF may be used as a method for providing QoS (Quality Of Service) upon real-time data transmission. The PCF, also known as a non-contentious transmission service, may be used alternately with a DCF-type contention-based service, rather than exclusively using the entire medium transmission period. In the PCF, a point coordinator implemented in the AP of the BSS may control the right for each STA to be able to occupy the medium using a polling scheme. The PCF may be given a priority over the DCF by setting the PIFS, which is an IFS (Inter-Frame Space) in the PCF, to be smaller than the DIFS, which is an IFS of the DCF. The IFS denotes an interval between frames, and the IFS may be used to set a priority in which an STA accesses the medium. The IFS may be specifically defined as follows.

Figure 9:
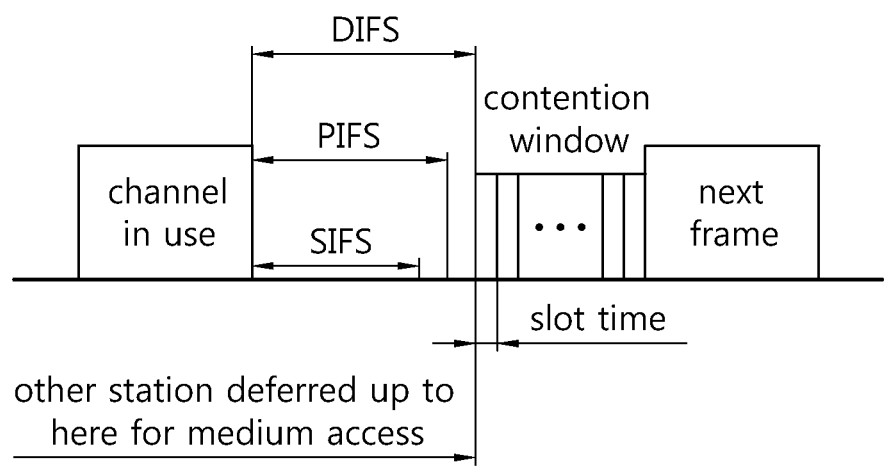
FIG. 9 is a concept view illustrating the interval between frames.

FIG. 9 is a concept view illustrating a frame interval.

Referring to FIG. 9, the interval between two frames may be referred to as an IFS. An STA may determine whether a channel is being used for a time period of the IFS as defined in the standards, using a carrier sensing scheme. The MAC layer using the DCF defines a plurality of IFSs. The priority of an STA occupying a radio medium may be determined by an IFS. Inter-frame intervals depending on types of IFSs are as follow:

(1) SIFS (Short Inter Frame Symbol): used upon RTS/CTS, ACK frame transmission. Highest priority
(2) PIFS (PCF IFS): used upon PCF frame transmission
(3) DIFS (DCF FIS): used upon DCF frame transmission
(4) EIFS (Extended IFS): used only when frame transmission error occurs. Not fixed interval In case the DCF is used for a plurality of STAs to share a radio medium at the MAC layer, various problems may arise. For example, when the DCF is used, if a plurality of STAs simultaneously conduct initial access to an AP, collision frequently occurs between the plurality of STAs. Further, the DCF lacks the concept of transmission priority and is not thus able to guarantee QoS (Quality Of Service) for traffic data transmitted from an STA. To address such issues, 802.11e defines a new coordination function, HCF (Hybrid Coordination Function), to enhance the channel access capability of the existing DCF and HCF. The HCF defines two channel access schemes, HCCA (HCF Controlled Channel Access) and EDCA (Enhanced Distributed Channel Access), similar to those defined in 802.11 MAC.

The EDCA and HCCA defines traffic categories that are transmission priorities, and the EDCA and HCCA may determine priorities at which channel access is conducted. In other words, the EDCA and HCCA may determine channel access priorities depending on types of traffic data by mutually defining a CW and an IFS according to the category of traffic data transmitted from an STA.

For example, in case traffic data is an email, the data may be allocated to a low priority class. As another example, in case traffic data is a voice communication through a wireless LAN, channel access may be conducted, with the traffic data allocated to a high priority class.

Upon use of the EDCA, traffic data with a higher priority would have relatively more chance to be transmitted as compared with traffic data with a lower priority. Further, an STA having higher-priority traffic may have a shorter average wait time than an STA having lower-priority traffic before transmitting packets. A transmission priority in the EDCA may be implemented by allocating a shorter CW to higher-priority traffic rather than lower-priority traffic while assigning an AIFS (Arbitration inter-Frame Space) that is shorter than the IFS that is a frame interval defined in the DCF. Further, the EDCA enables an STA to access a channel without contention during a period that is referred to as a TXOP (Transmit Opportunity). An STA may transmit as many packets as possible during a predetermined TXOP period within a range not exceeding the maximum period of the TXOP. If one frame is too long to be transmitted during one TXOP, the frame may be cut into smaller frames that may be then transmitted. Use of the TXOP may mitigate the situation that an STA with a low transmission rate excessively occupies a channel, which is a problem of the existing 802.11 DCF MAC.

Figure 10:
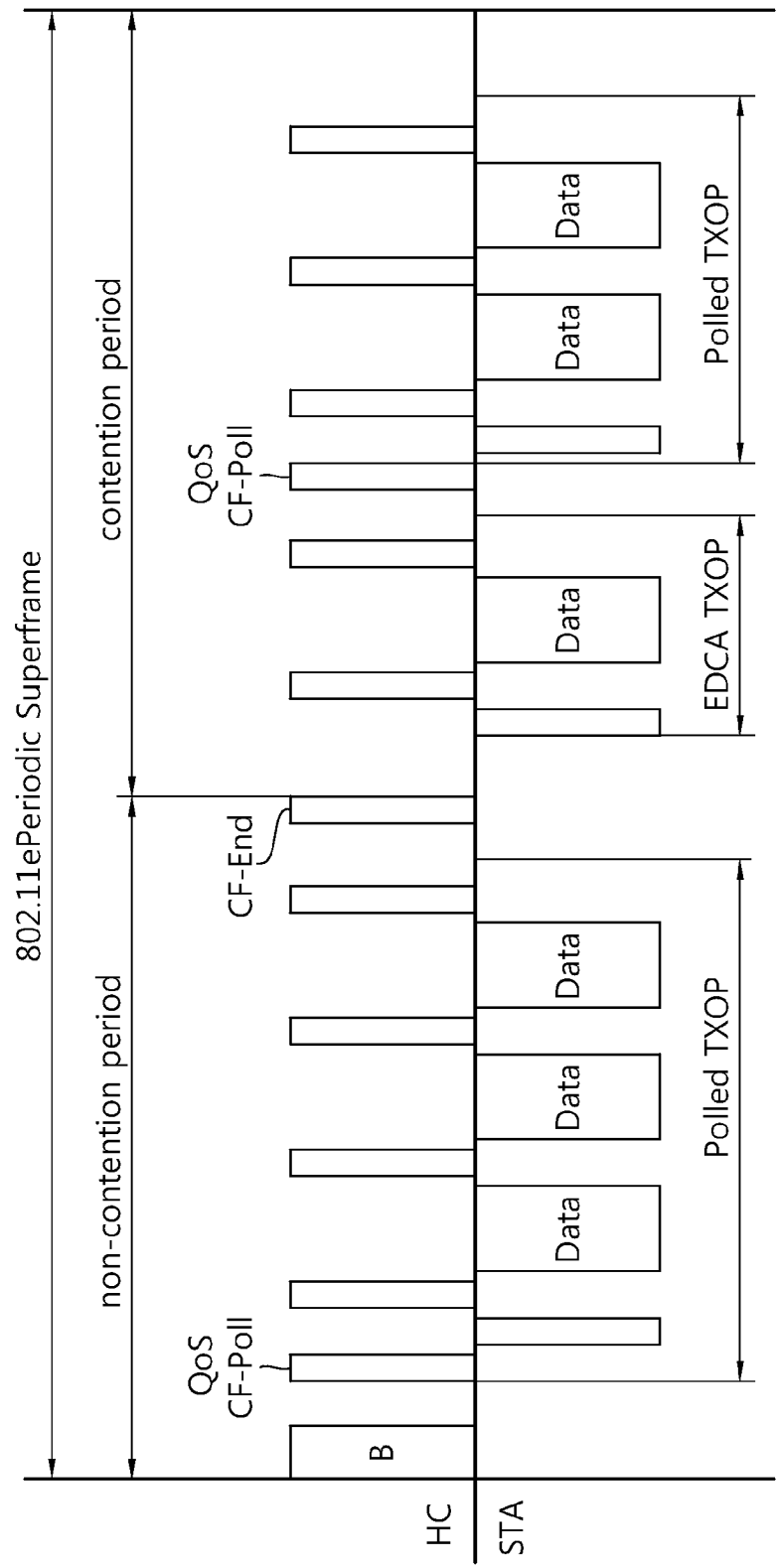
FIG. 10 is a concept view illustrating a method for obtaining a TXOP by an STA.

FIG. 10 is a concept view illustrating a method of obtaining a TXOP by an STA.

Referring to FIG. 10, an STA attending QoS transmission may use two channel access schemes such as EDCA and HCCA to obtain a TXOP by which the STA may transmit traffic for a predetermined traffic. The TXOP may be obtained by succeeding in an EDCA contention or by receiving a QoS CF-Poll frame from an access point. The TXOP obtained by succeeding in an EDCA contention is called an EDCA TXOP, and a TXOP obtained by receiving a QoS CF-Poll frame from an AP is called a Polled TXOP. As such, use of the concept "TXOP" enables an STA to be given a predetermined time during which the STA may transmit a frame or enables the transmission time of the STA to be forcedly constrained. The transmission start time and maximum transmission time of a TXOP may be determined by an AP. The EDCA TXOP may be notified to an STA by a beacon frame, and the Polled TXOP may be notified to an STA by a QoS CF-Poll frame.

The EDCA and HCCA which are channel access schemes defined in the HCF are hereinafter described in greater detail.

(1) EDCA

In the EDCA scheme, channel access may be conducted with eight user priorities defined for traffic data. For priority-based QoS data frame transmission, the EDCA defines four ACs (Access Categories: AC_BK, AC_BE, AC_VI, and AC_VO). The EDCA may, based on the ACs, map the traffic data arriving at the MAC layer with different user priorities as in the following <Table 2>.

Table 2 exemplifies the mapping between the user priorities and the ACs.

TABLE 2

| Priority | User Priority | AC(access category) |
|---|---|---|
| Low | 1 | AC_BK |
| | 2 | AC_BK |
| | 0 | AC_BE |
| | 3 | AC_BE |
| | 4 | AC_VI |
| | 5 | AC_VI |
| | 6 | AC_VO |
| High | 7 | AC_VO |

A transmission queue and an AC parameter may be defined for each AC. The differences in transmission priority between the ACs may be implemented based on the AC parameter values set to be different from each other. The EDCA may use AIFS[AC], CWmin[AC], and CWmax[AC] instead of DIFS, CWmin, and CWmax, respectively, which are parameters used in the DCF in the backoff procedure for transmitting the frames belonging to the AC. The parameters used in the backoff procedure for each AC may be carried over a beacon frame from an AP to each STA. As AIFS[AC] and CWmin [AC] decrease, a higher priority is given, and accordingly, the channel access delay shortens, thus allowing for use of more bands in a given traffic environment.

In case a collision occurs between the STAs while the STA transmits a frame, an EDCA backoff procedure of generating a new backoff counter is similar to the existing DCF backoff procedure, and differentiated backoff procedures for each AC may be performed based on different EDCA parameters. The EDCA parameters is becoming a critical means to differentiate channel access of various user priorities of traffic. A proper configuration of the EDCA parameter value including per-AC parameters may increase the transmission effect according to the priority of traffic while optimizing the network performance. Accordingly, an AP should conduct the overall management and adjustment function for the EDCA parameters to ensure that all of the STA attending the network may evenly access the medium.

Figure 11:
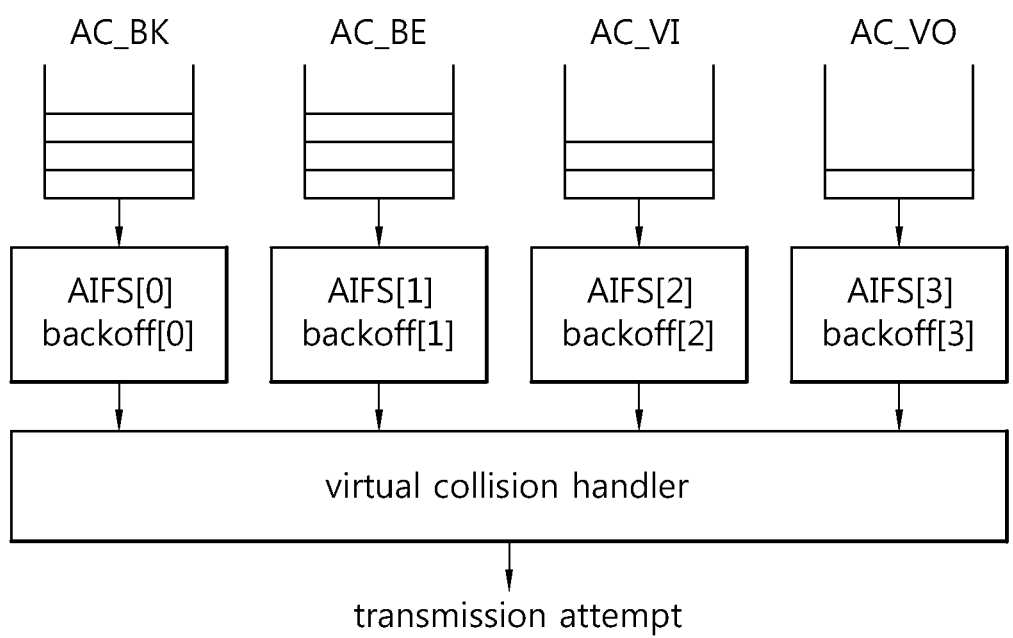
FIG. 11 is a concept view illustrating an EDCA channel reference model.

FIG. 11 is a concept view illustrating an EDCA channel reference model.

Referring to FIG. 11, the transmission queue for each of the four ACs defined in 802.11e MAC may play a role as an individual EDCA contention entity for radio medium access in one STA. One AC may retain an independent backoff counter with its own AIFS value. If there are one or more ACs that have simultaneously finished backoff, the collision between the ACs may be adjusted by a virtual collision handler. A frame is first transmitted to an AC having the highest priority, and the other ACs renew their backoff counters by increasing the contentious window values.

The start of a TXOP occurs upon accessing a channel according to the EDCA rules. If obtaining an EDCA TXOP when two or more frames stack in one AC, the EDCA MAC may attempt to transmit a number of frames. If an STA has already sent one frame and the STA may transmit a next frame in the same AC within the remaining TXOP time and receive an ACK thereto, the STA attempts transmission of the frame after an SIFS time interval. A TXOP constraint value may be transferred from the AP to the STA. In case the size of a data frame to be transmitted is in excess of the TXOP constraint value, the STA may fragment the frame into a number of smaller frames, and the STA may transmit the smaller frames within a range not exceeding the TXOP constraint value.

Figure 12:
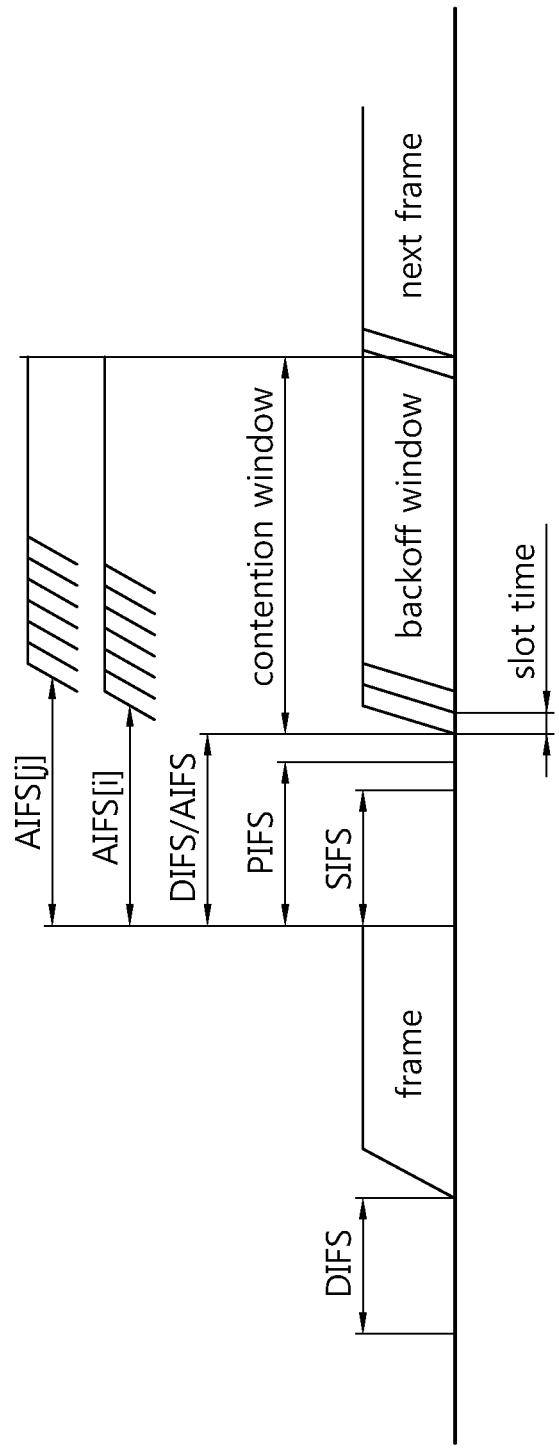
FIG. 12 is a concept view illustrating a backoff procedure by an EDCA.

FIG. 12 is a concept view illustrating a backoff procedure of an EDCA.

Referring to FIG. 12, each traffic data transmitted from an STA has a priority, and a backoff procedure may be conducted based on a contentious EDCA scheme. For example, the priorities respectively assigned to the traffics, as set forth above in Table 2, may be separated into eight, for example. As described above, one STA has different output queues depending on priorities, and each output queue is operated according to the EDCA rules. Each output queue may transmit traffic data using different AIFSs (Arbitration Interframe Spaces) according to each priority instead of the conventionally used DIFSs (DCF Interframe Spaces). Further, in case STAs are supposed to transmit traffics having different priorities at the same time, a traffic having a higher priority is transmitted earlier than the others, preventing collision in the terminal.

A backoff occurs under the following situations. A backoff is used when the frames transmitted from terminals cause collision and thus re-transmission is needed. To initiate a backoff, a terminal sets any backoff time in its backoff timer using Equation 2 below:

<Equation 2>

$$T_b[i] = \text{Random}(i) \times \text{SlotTime}$$

Here, Random(i) is a function that generates any integer between 0 and CW[i] using a uniform distribution. CW[i] is a contention window between the minimum contention window CWmin[i] and the maximum contention window CWmax[i], and i is a traffic priority. At every collision, a new contention window $CW_{new}[i]$ is computed using the following Equation 3 including a previous window $CW_{old}[i]$:

<Equation 3>

$$CW_{new}[i] = ((CW_{old}[i]+1) \times PF) - 1$$

Here, PF is computed according to the procedure defined in the IEEE 802.11e standard. CWmin[i], AIFS[i], and PF value may be transmitted from the AP using a QoS parameter set element that is a management frame.

(2) HCCA

The HCCA protocol uses an HC (Hyper Coordinator) that is positioned in an AP for centralized management on radio medium access. Since the HC performs integrated and centralized management on the radio medium, contention over radio medium access between STAs may be reduced, and exchange between data frames may be left in a short transmission delay time (SIFS), thus increasing network efficiency.

The HC controls transmission delay and scheduling by defining, in a parameter, a QoS characteristic for a particular traffic required by an application service to support QoS. Prior to the transmission of the parameterized QoS traffic, the HC establishes a virtual connection that is referred to as a traffic stream. The traffic stream may correspond to each of uplink from STA to AP, downlink from AP to STA, or direct link from STA to STA. In order to configure a traffic stream between an AP and an STA, QoS demand parameters such as delay time and traffic characteristics such as frame size and average transmission speed are exchanged through a mutual negotiation process.

In case the HC transmits a QoS CF-Poll frame to an STA, a TXOP constraint value that is a service provision time allowed to the STA is included in the QoS control field. In other words, the HC controls allocation of a medium access time using the TXOP. The TXOP constraint value is determined by a TSPEC. The TSPEC is requested by a station, and an AP determines whether to accept or decline the request for the TSPEC depending on network circumstances.

Once a traffic stream is configured, the HC provides contracted QoS by allocating a radio band required for the configured traffic stream between the AP and the STA. At a non-contention period of the HCCA, the HC has a right to control the medium, and if required, even at a contention period, the HC obtains a right to control the medium by transmitting a QoS CF-Poll frame after as long a delay time as the PIFS.

Figure 13:
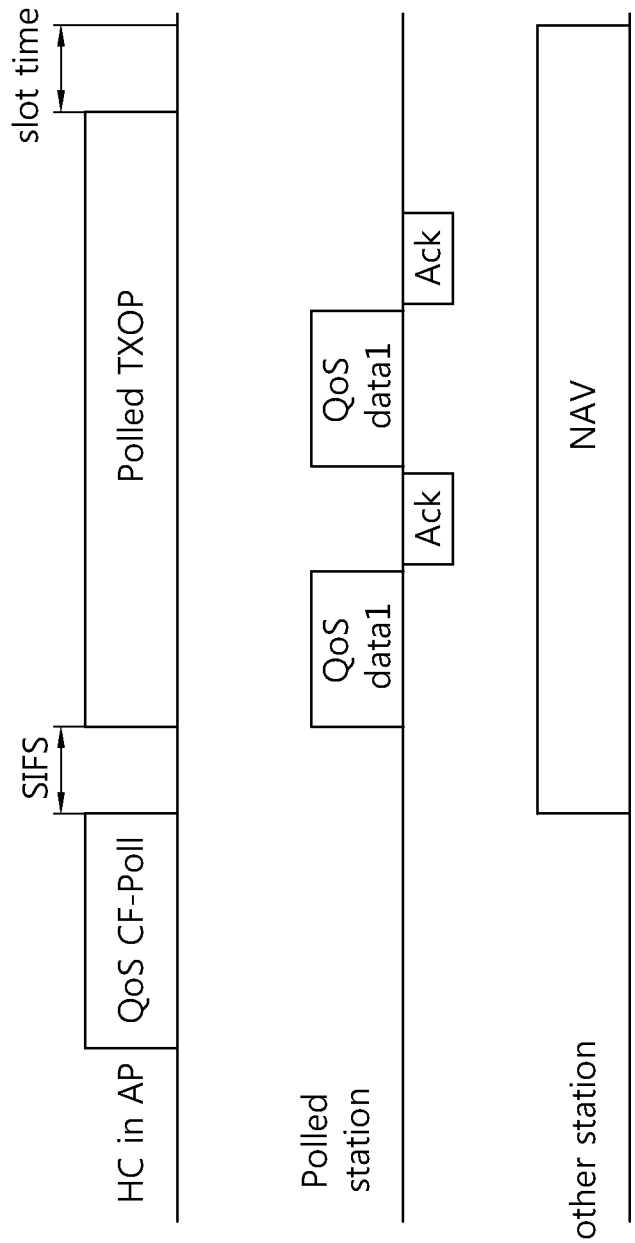
FIG. 13 is a concept view illustrating a polled TXOP timing.

FIG. 13 is a concept view illustrating a polled TXOP timing.

Referring to FIG. 13, a polled STA possessing a TXOP is rendered to have the authority to access channel for the time corresponding to the TXOP limit value designated in a QoS CF-Poll frame by receiving the QoS CF Poll frame and transmits several frames. In this case, other STAs also set up their own NAVs by summing the TXOP time and a predetermined time after receiving the QoS CF-Poll frame, although such does not apply to the other STAs, and do not contend for channel access for such time.

In the end, the HC needs to schedule proper transmission of the QoS CF-Poll frame to meet the agreed QoS requirements. Since a radio medium is subject to various channel conditions depending on times or positions, creating an efficient scheduling algorithm is a critical factor in supporting QoS. A good scheduling algorithm may permits more traffic streams without violating the QoS agreement, enhancing the performance of the radio network.

Now described is a method in which multiple STAs simultaneously perform initial access to an AP, while they are distributed, according to an embodiment of the present invention. For example, there may be multiple STAs attempting to access a specific AP in, e.g., a subway station, concert hall, or train station. In such case, the multiple STAs may collide with each other.

Disclosed is an access distribution method for reducing collisions that may occur upon channel access between the STAs.

In the case of passive scanning, multiple STAs receiving beacons transmit frames for authentication and/or association, and thus, access distribution may be more critical in passive scanning than in active scanning. Now described is a method in which STAs perform access distribution upon passive scanning, according to the present invention.

According to an embodiment of the present invention, an STA may receive an access distribution factor and may access a channel based on the received access distribution factor.

The access distribution factor may be transmitted to the STA through a beacon frame, an FILS discovery frame, or a measurement pilot frame. Hereinafter, according to an embodiment of the present invention, the beacon frame, FILS discovery frame or the measurement pilot frame is defined as a passive scanning frame.

The access distribution factor may be transmitted to the STA for the purpose of distributing the initial access times of STAs upon passive scanning. The STA may determine a minimum contention window value to perform passive scanning based on the access distribution factor. The access distribution factor may contain a value considering the load condition of the AP.

The access distribution factor may be defined as in the Table 3.

TABLE 3

| Field | Description |
| --- | --- |
| Access distribution factor 'N' | This parameter may be included in a beacon frame or an FILS discovery frame.<br>This parameter may be transferred to STAs for the purpose of distributing the STAs upon passive scanning.<br>This parameter may contain a value considering the load condition of the AP. |

The STA may choose an access random variable within a range as shown in Equation 4 based on the access distribution factor N received through the passive scanning frame.

<Equation 4>

$$1 \leq \text{access random variable} \leq \text{access distribution factor 'N'}$$

The STA may select an access random variable based on the received access distribution factor N and may access a channel using an initial access parameter (e.g., a backoff parameter or inter frame symbol) obtained based on the access random variable. Hereinafter, according to an embodiment of the present invention, the random variable determined based on the access distribution factor may be referred to as an access random variable.

The access distribution factor may be a value adaptively selected depending on the load condition of the AP and may be determined by the AP. For example, as the load of the AP increases, a larger value of access distribution factor may be transmitted to STAs, so that the access of the STAs may be distributed at broad time periods.

The STA may determine the minimum contention window (CW) value based on the access random variable determined based on the determined access distribution factor. In other words, the minimum CW value may vary depending on the access random variable selected by the STA. According to an embodiment of the present invention, the minimum CW value is termed a passive scanning-specific minimum contention window value.

For example, the STA may determine the passive scanning-specific minimum contention window value for accessing the channel based on Equation 5 above.

<Equation 5> passive scanning specific contention window min=access random variable×basic contention window min That is, referring to FIG. 5, the passive scanning-specific minimum contention window value (Passive scanning specific Contention Window min) may be the value obtained by multiplying the access random variable (Random variable) with a basic minimum contention window value (basic Contention Window Min).

The basic minimum contention window value may be a predetermined value or a value adaptively varying. For example, the minimum contention window value defined by the QoS management frame policy of 802.11ae may be adopted as the basic minimum contention window value. Or, in the case of using an EDCA algorithm, the basic minimum contention window value may vary depending on set data categories.

Equation 5 represents an example for computing a passive scanning specific minimum contention window value through the access random variable selected based on the access distribution factor received by the STA. That is, the passive scanning specific minimum contention window value may be determined by other methods as well.

As described above, a backoff time for the STA to perform a backoff procedure may be obtained based on Equation 6 below.

<Equation 6>

Backoff time=random( )×aSlotTime

Random( )=[0, CW]
passive scanning specific contention window min≤CW≤aCWMax

Referring to Table 6, the passive scanning specific minimum contention window values determined by the STAs based on the selected random variables may be different from each other, and accordingly, different backoff times are determined, thus enabling the STAs to perform channel access, distributed. In Equation 6, aSlotTime is the unit time, and random is a random function for selecting a value between 0 and the selected CW. aCWMax is the maximum value is the maximum CW value in unit of aSlotTime, the passive scanning specific minimum contention window value (passive scanning specific contention window min) the minimum CW value in unit of aSlotTime, and CW a value selected between the passive scanning specific minimum contention window value and aCWMax.

According to the present invention, thus, upon performing initial access for transmitting a management frame, the STAs having received the beacon frame in the passive scanning might not use the same minimum contention window value. The STAs may set up different minimum contention window values depending on the random variable values randomly selected per STA based on the access distribution factors, enabling the distribution of channel access of the STAs when the STAs having received the same beacon frame access the channel to transmit authentication request frames or association request frames. According to an embodiment of the present invention, hereinafter assume that the STAs perform channel access to transmit authentication request frames for ease of description.

According to an embodiment of the present invention, the STAs may distribute initial channel access by determining not only the minimum contention window values but also inter frame symbol values, such as AIFSN values, according to random values. AIFSN is an example of an inter frame symbol for channel access.

<Equation 7> passive scanning specific AIFSN=access random variable×basic AIFSN

Referring to FIG. 7, a passive scanning specific AIFSN may be determined as a value obtained by multiplying a random variable with a basic AIFSN.

The basic AIFSN may be determined by referencing the AIFSN value defined by the 802.11ae QoS management frame policy. Equation 7 represents an example of computing the passive scanning specific AIFSN through the random variable selected based on the access distribution factor, and the passive scanning specific AIFSN may be determined by other methods.

According to the present invention, the passive scanning specific minimum contention window value and the passive scanning specific AIFSN may apply even to the case where the STA receives an FILS discovery frame whose AP configuration change count value does not change. The AP configuration change count value is the version number of an AP configuration information set and may increase in case the non-dynamic field or element in the beacon frame or probe response frame is changed. In other words, it may be applicable to the case where the content in the beacon frame does not change, and thus, the STA transmits a management frame (authentication request frame or association request frame) for initial access immediately after receiving the FILS discovery frame.

Figure 14:
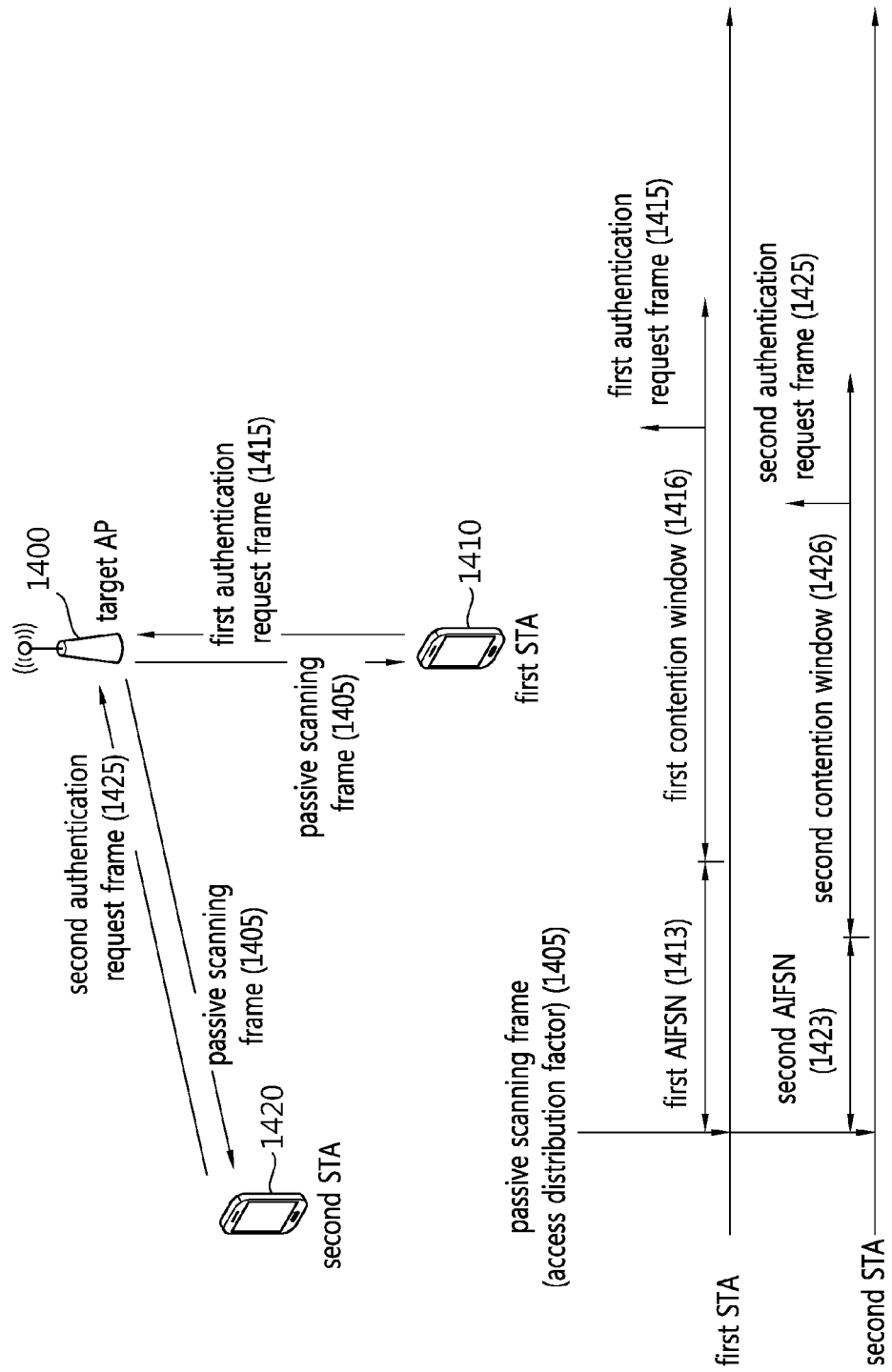
FIG. 14 is a concept view illustrating an access distribution method by an STA according to an embodiment of the present invention.

FIG. 14 is a concept view illustrating an access distribution method by an STA according to an embodiment of the present invention.

FIG. 14 illustrates STAs that determine AIFSNs and contention windows based on the above-described access distribution factor and transmit authentication request frames.

The first STA 1410 and the second STA 1420 may receive a passive scanning frame 1405 from the AP 1400. The passive scanning frame 1405 received by the first STA 1410 and the second STA 1420 may include the access distribution factor.

The first STA 1410 may select a first access random variable based on the received access distribution factor, and the second STA 1420 may select a second access random variable based on the received access distribution factor.

The first STA 1410 may determine a first AIFSN 1413 and a first contention window 1416 based on the first access random variable and transmit a first authentication request frame 1415.

The second STA 1420 may determine a second AIFSN 1423 and a second contention window 1426 based on the second access random variable and transmit a second authentication request frame 1425.

That is, the plurality of STAs may determine different inter frame symbols and passive scanning specific minimum contention window values based on the determined access random variables. Each STA may distributively access the channel based on the different inter frame symbols and passive scanning specific minimum contention window values.

According to an embodiment of the present invention, the plurality of STAs, when performing channel access, may set only either the inter frame symbols or passive scanning specific minimum contention window values to be different from each other based on the access random variables. Now described is a method in which a plurality of STAs perform channel access by selecting different inter frame symbols or passive scanning specific minimum contention window values according to an embodiment of the present invention.

Figure 15:
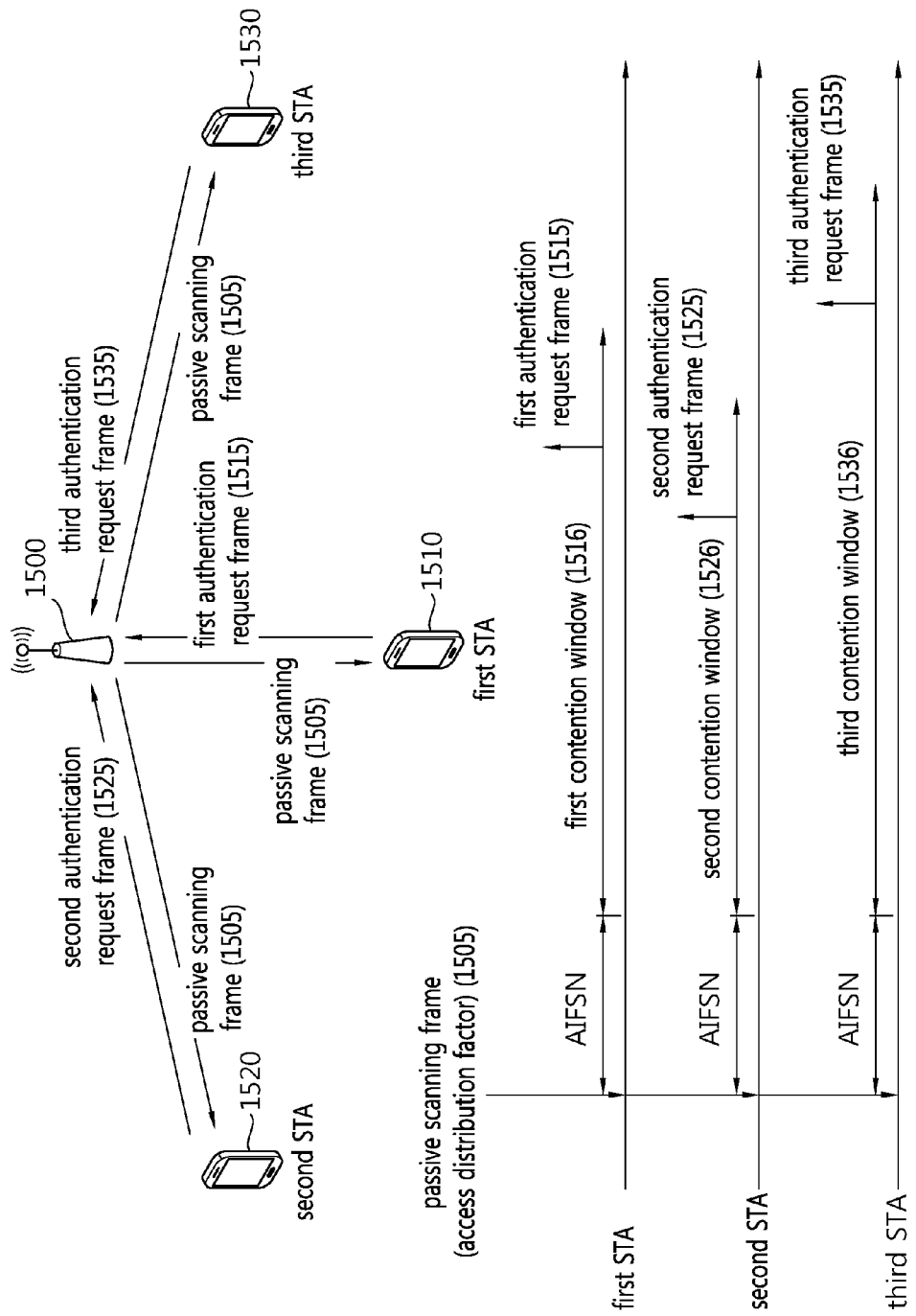
FIG. 15 is a concept view illustrating a method for enabling a plurality of STAs to access an AP according to an embodiment of the present invention.

FIG. 15 is a concept view illustrating a method in which a plurality of STAs access an AP according to an embodiment of the present invention.

FIG. 15 illustrates a method in which a plurality of STAs select different access random variables based on the access distribution factor, and the plurality of STAs access an AP using the passive scanning specific minimum contention window values determined based on the selected access random variables.

Referring to FIG. 15, the first STA 1510 to the third STA 1530 may select a first access random variable, a second access random variable, and a third access random variable based on the access distribution factor included in the received passive scanning frame 1505. The access random variables selected by the first STA 1510 to the third STA 1530 may be equal or larger than one and equal or smaller than the access distribution factor value.

The first STA 1510, the second STA 1520, and the third STA 1530 may determine the passive scanning specific minimum contention window values based on the selected access random variables. The passive scanning specific minimum contention window values may be the values obtained by multiplying the minimum basic contention window value with the access random variables selected by the STAs 1510, 1520, and 1530. That is, the passive scanning specific minimum contention window values of the STAs 1510, 1520, and 1530 may be determined as follows: for the first STA 1510, the passive scanning specific minimum contention window value is the value obtained by multiplying the first access random variable with the minimum basic contention window value, for the second STA 1520, the value obtained by multiplying the second access random variable with the minimum basic contention window value, and for the third STA 1530, the value obtained by multiplying the third access random variable with the minimum basic contention window value. Each STA 1510, 1520, and 1530 may determine different CWs based on each passive scanning specific minimum contention window value. The contention window determined by the first STA may be denoted a first contention window 1516, the contention window assigned by the second STA 1520 a second contention window 1526, and the contention window assigned by the third STA 1530 a third contention window 1536. The first STA 1510 to the third STA 1530 may select random variables from the assigned contention windows as in the above described Equation 6, determine backoff times based on the selected random variables, and distributively transmit their respective authentication frames. That is, the first STA 1510 may set the backoff time based on the random variable selected from the first contention window 1516 and transmit a first authentication request frame 1515. The second STA 1520 may set the backoff time based on the random variable selected from the second contention window 1526 and transmit a second authentication request frame 1525. The third STA 1530 may set the backoff time based on the random variable selected from the third contention window 1536 and transmit a third authentication request frame 1535.

Figure 16:
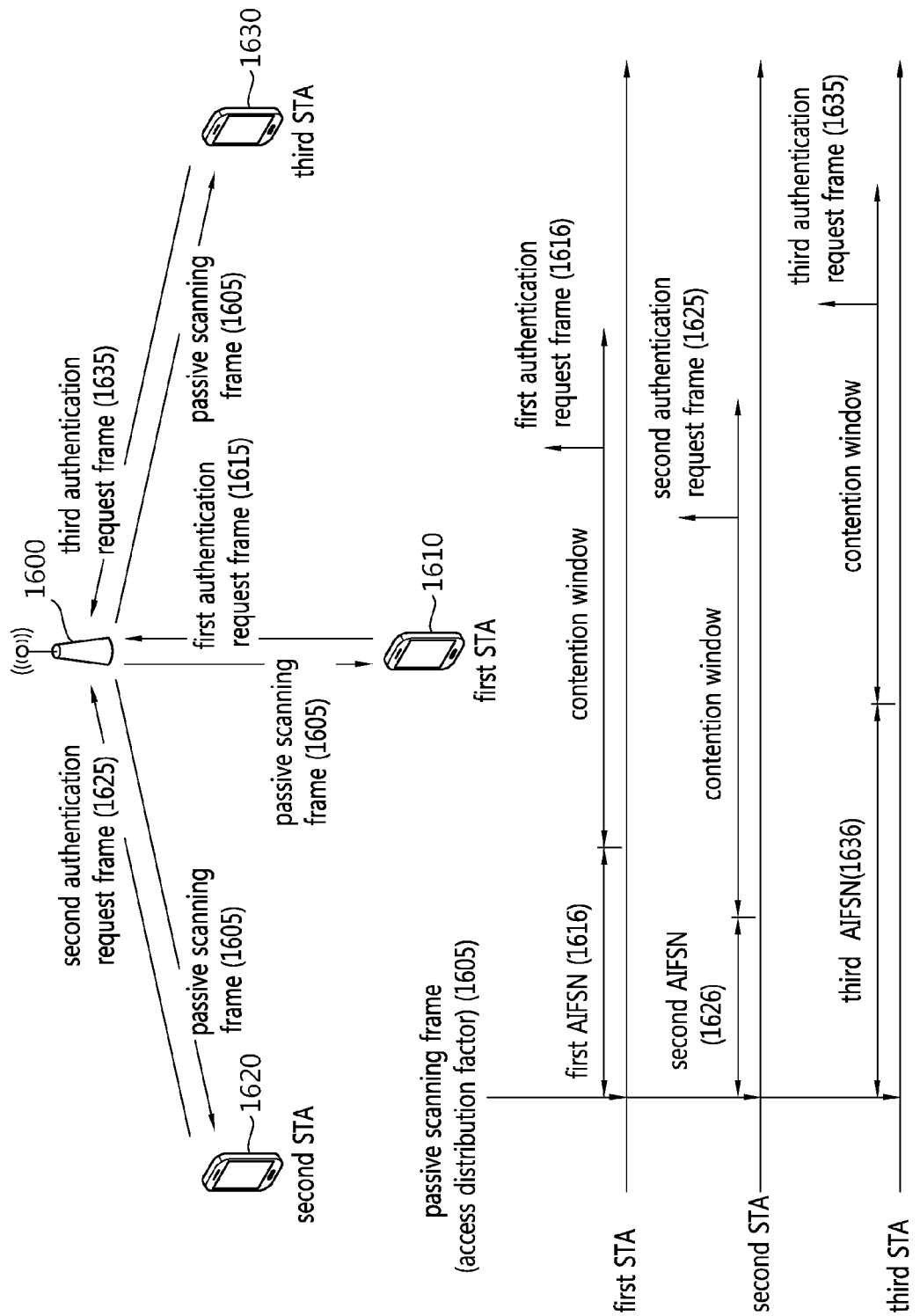
FIG. 16 is a concept view illustrating a method for enabling a plurality of STAs to access an AP according to an embodiment of the present invention.

FIG. 16 is a concept view illustrating a method in which a plurality of STAs access an AP according to an embodiment of the present invention.

FIG. 16 illustrates a method in which a plurality of STAs access an AP by selecting different AIFSNs as well as different random variables.

Referring to FIG. 16, the plurality of STAs 1610, 1620, and 1630 may determine AIFSNs for selecting different access random variables based on the access distribution factor to access the channel. For example, the AIFSN, depending on categories, may be 9 for AC_BK, 6 for AC_BE, 3 for AC_VI, and 2 for AC_VO.

It may be assumed that when the first STA 1610, the second STA 1620, and the third STA 1630 select a first access random variable, a second access random variable, and a third access random variable, respectively, is the case where the data of the first STA 1610, the second STA 1620, and the third STA 1630 is AC_VO and the AIFSN is 2. In such case, the AIFSN of each STA may be determined based on each access random variable as in Equation 7. For enabling channel access, the first AIFSN 1616 of the first STA 1610 may be computed based on the first access random variable, the second AIFSN 1626 of the second STA 1620 the second access random variable, and the second AIFSN 1636 of the third STA 1630 the third access random variable.

According to an embodiment of the present invention, the values obtained by multiplying the access random variables selected by the STAs with the AIFSNs determined depending on the categories as in Equation 7 may be put in use. Also, the final AIFSNs may be determined so that the STAs' AIFSNs are proportionally mapped to a predetermined range by multiplying a predetermined ratio. In other words, the inter frame symbols used by each STA upon channel access may be determined in various ways.

In case each STA accesses the channel based on different AIFSNs, even when the minimum contention window values for determining the contention windows are the same, the plurality of STAs may simultaneously access the channel preventing collisions.

Figure 17:
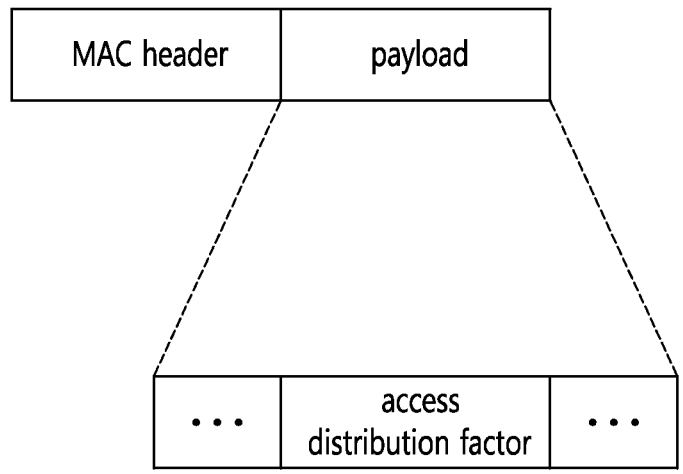
FIG. 17 is a concept view illustrating a passive scanning frame according to an embodiment of the present invention.

FIG. 17 is a concept view illustrating a passive scanning frame according to an embodiment of the present invention.

FIG. 17 illustrates a passive scanning frame (e.g., a beacon frame, FILS discovery frame, or measurement pilot frame).

Referring to FIG. 17, the passive scanning frame may include an access distribution factor 1700.

The access distribution factor 1700 included in the passive scanning specific may be transferred to the STAs for distributing the initial access times of the STAs upon passive scanning. The access distribution factor 1700 may contain a value considering the load condition of the AP. In case the AP has a larger load, a larger value of the access distribution factor 1700 may be transmitted, so that a specific STA sets a larger passive scanning specific minimum contention window value. In contrast, when the AP has a smaller load, a smaller value of the access distribution factor 1700 may be transmitted, so that the STA sets a smaller passive scanning specific minimum contention window value. The load of the AP may be computed based on the information, such as, the number of STAs currently associated with the AP.

When receiving the access distribution factor 1700 of the passive scanning frame, the STAs may determine the passive scanning specific minimum contention window values and/or AIFSNs to be different from each other as described above, distributing the STAs' access periods.

Figure 18:
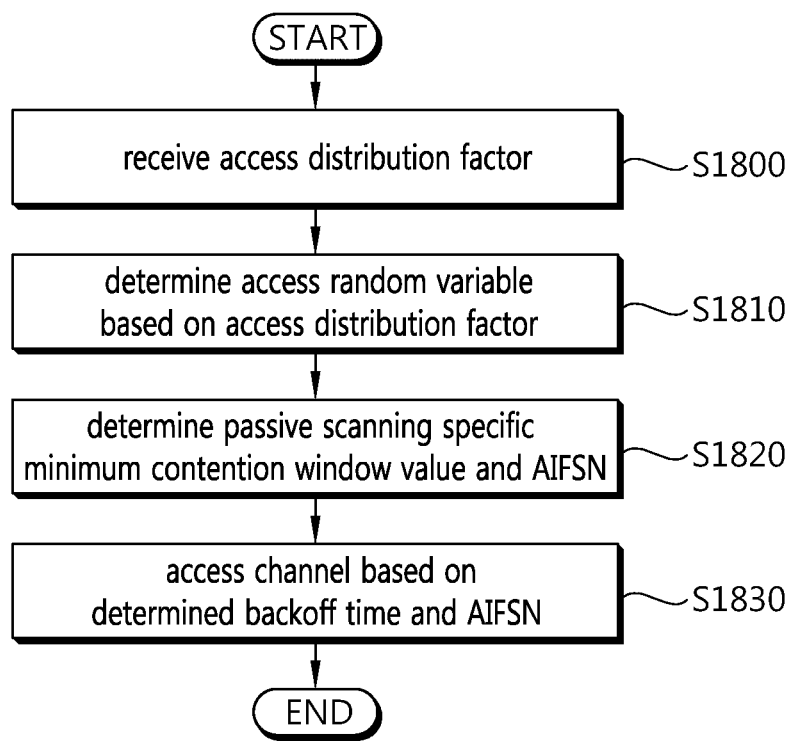
FIG. 18 is a concept view illustrating a channel access method by an STA according to an embodiment of the present invention.

FIG. 18 is a concept view illustrating a channel access method by an STA according to an embodiment of the present invention.

FIG. 18 illustrates a method in which an STA determines a passive scanning specific minimum contention window value and an AIFSN based on the access distribution factor. As described above, however, the STA may determine at least one of the passive scanning specific minimum contention window value and the AIFSN based on the access distribution factor in order to perform channel access.

The access distribution factor is received (step S1800).

The STA may receive the access distribution factor through a passive scanning frame.

An access random variable is determined based on the access distribution factor (step S1810).

The STA may determine the access random variable based on the access distribution factor. The access random variable may be determined as a value smaller than the access distribution factor, for example. The determined access random variable may be used to determine the passive scanning specific minimum contention window value or the AIFSN.

The passive scanning specific minimum contention window value and the AIFSN are determined (step S1820).

The STA may determine the passive scanning specific minimum contention window value and the AIFSN for determining the backoff time for use in channel access based on the determined access random variable. The passive scanning specific minimum contention window value and the AIFSN may be computed based on the above described Equations 5 and 7 or may be determined by other various methods.

Channel access is performed based on the determined backoff time and the AIFSN (step S1830).

The STA may transmission an authentication request frame or association request frame the AP based on the backoff time and AIFSN determined in step S1720.

By using such method, STAs, respectively, may access the AP in several time periods, temporally distributed.

Figure 19:
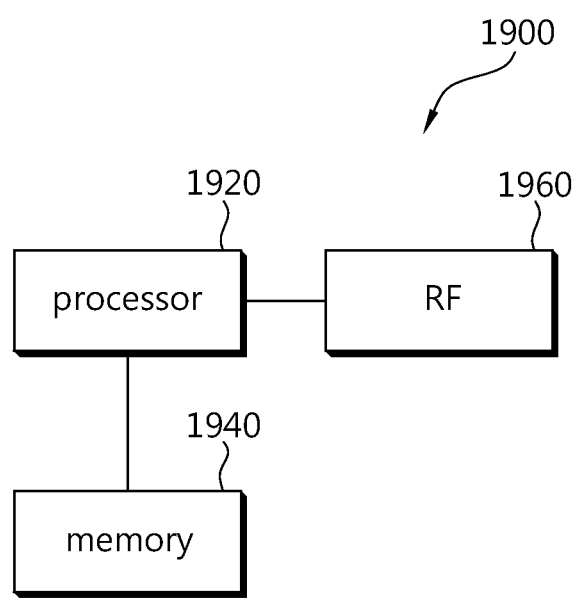
FIG. 19 is a block diagram illustrating a wireless device to which an embodiment of the present invention may apply.

FIG. 19 is a block diagram illustrating a wireless device to which an embodiment of the present invention may apply.

Referring to FIG. 19, the wireless device 1900 may be an AP or a non-AP station (STA), as an STA that may implement the above-described embodiments.

The wireless device 1900 includes a processor 1920, a memory 1940, and an RF (Radio Frequency) unit 1960.

The RF unit 1960 may be connected with the processor 1920 to communicate radio signals.

The processor 1920 implements the functions, processes, and/or methods proposed herein. For example, the processor 1920 may be implemented to perform the operation of the wireless device according to the above-described embodiments of the present invention.

For example, the processor 1920, in case the wireless device is an AP, may be implemented to transmit a passive scanning frame including an access distribution factor to STAs.

Further, the processor 1920, in case the wireless device is an STA, may be implemented to receive the access distribution factor through the passive scanning frame, select the access random variable based on the access distribution factor, determine the passive scanning specific minimum contention window value based on the access random variable, and perform channel access based on the backoff time determined based on the passive scanning specific minimum contention window value.

The processor 1920 may include an ASIC (application-specific integrated circuit), other chipset, a logic circuit, a data processing device and/or a converter converting a baseband signal and radio signal into each other. The memory 1940 may include a ROM (read-only memory), a RAM (random access memory), a flash memory, a memory card, a storage medium and/or other storage device. The RF unit 1960 may include one or more antennas for communicating radio signals.

When the embodiments are implemented in software, the above-described schemes may be embodied in modules (processes, or functions) for performing the above-described functions. The modules may be stored in the memory 1940 and may be executed by the processor 1920. The memory 1940 may be positioned in or outside the processor 1920 and may be connected with the processor 1920 via a known means.

What is claimed is:

1. A method for a channel access of a station (STA), comprising:
   receiving, by the STA, an access distribution factor through a passive scanning frame;
   selecting, by the STA, an access random variable based on the access distribution factor;
   determining, by the STA, a passive scanning specific minimum contention window value based on the access random variable; and
   performing, by the STA, the channel access based on a backoff time determined based on the passive scanning specific minimum contention window value.

2. The method of claim 1,
   wherein a minimum value of the passive scanning specific contention window is a value obtained by multiplying the access random variable with a predetermined minimum basic contention window value,
   wherein the backoff time is computed based on a random variable, and
   wherein the random variable is a value determined within a range having the minimum value of the passive scanning specific contention window as a minimum boundary.

3. The method of claim 2,
   wherein the backoff time is determined as follows, backoff time=random( )×aSlotTime Random( )=[0,CW]
   minimum value of passive scanning specific contention window≤CW≤aCWMax
   where aSlotTime is a unit time, Random is a random function, aCWMax is a maximum CW value in unit of aSlotTime, the minimum value of the passive scanning specific minimum contention window is a minimum CW value in unit of aSlotTime, CW is a value selected between the passive scanning specific minimum contention window value and aCWMax.

4. The method of claim 1, further comprising:
   determining, by the STA, a number of inter frame symbols for the channel access based on the access random variable,
   wherein the backoff time is reduced when a channel is idle during a period corresponding to the determined number of the inter frame symbols.

5. The method of claim 4,
   wherein the number of the inter frame symbols is a value obtained by multiplying the access random variable with a predetermined arbitration inter-frame space number (AIFSN).

6. The method of claim 1,
   wherein the passive scanning frame is one of a beacon frame, an fast initial link setup (FILS) discovery frame or a measurement pilot frame.

7. The method of claim 1,
   wherein the access random variable is selected as a value smaller than the access distribution factor.

8. The method of claim 1,
   wherein the access distribution factor indicates N (where, N is an integer), and wherein N is a value determined based on a load of an access point (AP) transmitting the passive scanning frame.

9. A station (STA) operating in a wireless LAN, the STA comprising:
an RF (radio frequency) unit configured to transmit or receive a radio signal; and
a processor operatively connected with the RF unit configured to:
receive an access distribution factor through a passive scanning frame,
select an access random variable based on the access distribution factor,
determine a passive scanning specific minimum contention window value based on the access random variable, and
perform the channel access based on a backoff time determined based on the passive scanning specific minimum contention window value.

10. The STA of claim 9,
wherein a minimum value of the passive scanning specific contention window value is a value obtained by multiplying the access random variable with a predetermined minimum basic contention window value,
wherein the backoff time is computed based on a random variable, and
wherein the random variable is a value determined within a range having the minimum value of the passive scanning specific contention window as a minimum boundary.

11. The STA of claim 10,
wherein the backoff time is determined as follows, backoff time=random( )×aSlotTime Random( )=[0,CW]
minimum value of passive scanning specific contention window≤CW≤aCWMax where aSlotTime is a unit time, Random is a random function, aCWMax is a maximum CW value in unit of aSlotTime, the minimum value of the passive scanning specific minimum contention window is a minimum CW value in unit of aSlotTime, CW is a value selected between the passive scanning specific minimum contention window value and aCWMax.

12. The STA of claim 9,
wherein the processor is configured to determine the number of inter frame symbols for the channel access based on the access random variable, and
wherein the backoff time is reduced when a channel is idle during a period corresponding to the determined number of the inter frame symbols.

13. The STA of claim 12,
wherein the number of the inter frame symbols is a value obtained by multiplying the access random variable with a predetermined arbitration inter-frame space number (AIFSN).

14. The STA of claim 9,
wherein the passive scanning frame is one of a beacon frame, a fast initial link setup (FILS) discovery frame, or a measurement pilot frame.

15. The STA of claim 9,
wherein the access random variable is selected as a value smaller than the access distribution factor.

16. The STA of claim 9,
wherein the access distribution factor indicates N (where, N is an integer), and
wherein N is a value determined based on a load of an access point (AP) transmitting the passive scanning frame.

* * * * *